US012576368B2

(12) United States Patent
Hironaka

(10) Patent No.: US 12,576,368 B2
(45) Date of Patent: Mar. 17, 2026

(54) GAS SEPARATION MEMBRANE, GAS SEPARATION MODULE, GAS SEPARATION APPARATUS, AND POLYIMIDE COMPOUND

(71) Applicant: FUJIFILM Corporation, Tokyo (JP)

(72) Inventor: Koji Hironaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 454 days.

(21) Appl. No.: 18/063,070

(22) Filed: Dec. 7, 2022

(65) Prior Publication Data

US 2023/0119573 A1 Apr. 20, 2023

Related U.S. Application Data

(63) Continuation of application No. PCT/JP2021/020809, filed on Jun. 1, 2021.

(30) Foreign Application Priority Data

Jun. 16, 2020 (JP) ................................ 2020-104052

(51) Int. Cl.
*B01D 53/22* (2006.01)
*B01D 69/12* (2006.01)
*B01D 71/64* (2006.01)
*C08G 73/10* (2006.01)

(52) U.S. Cl.
CPC ........... *B01D 71/64* (2013.01); *B01D 53/228* (2013.01); *B01D 69/12* (2013.01); *C08G 73/1067* (2013.01)

(58) Field of Classification Search
CPC ...... B01D 71/64; B01D 53/228; B01D 69/12; C08G 73/1067
See application file for complete search history.

(56) References Cited

U.S. PATENT DOCUMENTS 5,178,650 A * 1/1993 Hayes .................... B01D 71/64 95/47
5,246,743 A * 9/1993 Kusuki ................ B01D 67/009 427/296
5,817,165 A * 10/1998 Hachisuka ......... C08G 73/1039 96/13
5,969,087 A * 10/1999 Maeda .................. B01D 71/64 528/229

(Continued)

FOREIGN PATENT DOCUMENTS

CN 110105571 8/2019
JP H09173801 7/1997

(Continued)

OTHER PUBLICATIONS

CN110105571A_Machine Translation (Year: 2019).*

(Continued)

*Primary Examiner* — Anthony Shumate
(74) *Attorney, Agent, or Firm* — JCIPRNET

(57) ABSTRACT

Provided are a polyimide compound including a repeating unit having an aromatic diamine component having a specific structure in which a side-chain benzylic position is regioselectively brominated, a gas separation membrane having a gas separation layer containing the polyimide compound, and a gas separation module and a gas separation apparatus each having the gas separation membrane.

8 Claims, 2 Drawing Sheets

(56) References Cited

U.S. PATENT DOCUMENTS

| | | | | |
|---|---|---|---|---|
| 6,531,569 | B1 | 3/2003 | Tachiki et al. | |
| 10,040,035 | B2 | 8/2018 | Usami et al. | |
| 2018/0355108 | A1 | 12/2018 | Jo et al. | |
| 2020/0199348 | A1* | 6/2020 | Kim | C08F 22/40 |
| 2021/0221953 | A1 | 7/2021 | Jo et al. | |
| 2022/0184549 | A1* | 6/2022 | Nakamura | B01D 69/08 |

FOREIGN PATENT DOCUMENTS

| | | |
|---|---|---|
| JP | 2015083296 | 4/2015 |
| JP | 2017131856 | 8/2017 |
| JP | 2019002001 | 1/2019 |
| KR | 20160064835 | 6/2016 |
| WO | 0056430 | 9/2000 |

OTHER PUBLICATIONS

JP09173801A_Machine Translation (Year: 1997).*
JP2017131856A_Machine Translation (Year: 2017).*
KR20160064835A_Machine Translation (Year: 2016).*
"International Search Report (Form PCT/ISA/210) of PCT/JP2021/020809", mailed on Aug. 10, 2021, with English translation thereof, pp. 1-5.
"Written Opinion of the International Searching Authority (Form PCT/ISA/237) of PCT/JP2021/020809", mailed on Aug. 10, 2021, with English translation thereof, pp. 1-8.
"Office Action of Japan Counterpart Application" with English translation thereof, issued on May 23, 2023, p. 1-p. 11.

* cited by examiner

GAS SEPARATION MEMBRANE, GAS SEPARATION MODULE, GAS SEPARATION APPARATUS, AND POLYIMIDE COMPOUND

CROSS-REFERENCE TO RELATED APPLICATIONS

This application is a Continuation of PCT International Application No. PCT/JP2021/020809 filed on Jun. 1, 2021, which claims priority under 35 U.S.C. § 119 (a) to Japanese Patent Application No. 2020-104052 filed in Japan on Jun. 16, 2020. Each of the above applications is hereby expressly incorporated by reference, in its entirety, into the present application.

BACKGROUND OF THE INVENTION

1. Field of the Invention

The present invention relates to a gas separation membrane, a gas separation module, and a gas separation apparatus. The present invention also relates to a polyimide compound suitable as a constituent material of a gas separation layer of the gas separation membrane.

2. Description of the Related Art

Materials made of polymer compounds have gas permeability specific to each material. Due to this nature, selective permeation and separation of a gas component of interest can be achieved by using a membrane formed of a specific polymer compound. Regarding industrial applications of such a gas separation membrane, in relation to the issue of global warming, separation and recovery of carbon dioxide from large-scale carbon dioxide sources have been studied in thermal power plants, cement plants, blast furnaces of steel mills, and the like. In addition, natural gas and biogas (gases generated by fermentation or anaerobic digestion of excrements of organisms, organic fertilizers, biodegradable substances, sewage, garbage, energy crops, and the like) are mixed gases mainly containing methane and carbon dioxide, and use of a gas separation membrane has been studied as means for removing impurities such as carbon dioxide from the mixed gases.

In purification of natural gas with a gas separation membrane, high gas permeability and high gas separation selectivity are required in order to more efficiently separate a target gas. To achieve this, various membrane materials have been studied, and as part of this study, gas separation membranes that use polyimide compounds have been studied. For example, JP2015-083296A discloses a polyimide compound having a diamine component obtained by introducing a particular polar group to a particular site of m-phenylenediamine. According to the technique disclosed in JP2015-083296A, by forming a gas separation layer of a gas separation membrane using the polyimide compound, both gas permeability and gas separation selectivity can be improved, and degradation of performance due to plasticizing components in the gas can also be suppressed.

WO2000/56430A discloses a bromine-modified cardo polyimide compound having a bisaniline fluorene-derived diamine component having bromine-substituted methyl or bromine-substituted ethyl. According to the technique disclosed in WO2000/56430A, by forming a membrane using the polyimide compound, the polyimide membrane can be provided with increased gas separation selectivity.

To provide a practical gas separation membrane, it is necessary to secure sufficient gas permeability by forming a gas separation layer as a thin layer and at the same time to achieve desired gas separation selectivity. One method of forming a gas separation layer as a thin layer is a method in which a polymer compound such as a polyimide compound is subjected to a phase separation process to form an asymmetric membrane, with a portion that contributes to separation being formed as a thin layer called a dense layer or a skin layer. In this asymmetric membrane, the portion other than the dense layer functions as a support layer responsible for mechanical strength of the membrane.

In addition to the asymmetric membrane, a form of a composite membrane is also known in which a gas separation layer having a gas separation function and a support layer responsible for mechanical strength are made of different materials, and the gas separation layer having gas separation capability is formed as a thin layer on a gas-permeable support layer.

SUMMARY OF THE INVENTION

In general, gas permeability and gas separation selectivity of a gas separation membrane are in a so-called trade-off relationship. Therefore, although either gas permeability or gas separation selectivity of a gas separation layer can be improved by adjusting, for example, copolymerization components of a polyimide compound used for the gas separation layer, it is difficult to achieve both the characteristics at high levels. In addition, it is known that impurity components such as benzene, toluene, and xylene are present in a mixed gas to be separated such as natural gas, and these components cause membrane plasticization to impair gas separation selectivity. On the other hand, there is a natural gas field that releases a gas in which the amount of these impurity components is small, and when such a mixed gas in which the amount of the impurity components is small is subjected to separation treatment using a gas separation membrane, a phenomenon such as densification of the membrane occurs over time instead of plasticization of the membrane, as a result of which gas permeability may be impaired or it may take a long time until gas permeability becomes stable. Thus, a gas separation membrane used for separation treatment of a mixed gas in which the amount of impurity components is small is required to be capable of sufficiently maintaining gas permeability even when the separation treatment of the mixed gas in which the amount of impurity components is small is performed over a long period of time, and is also required to exhibit stable gas permeability at an early stage after the start of the gas separation treatment.

An object of the present invention is to provide a gas separation membrane that has high gas permeability and high gas separation selectivity, that exhibits stable gas permeability at an early stage even when used for separation treatment of a mixed gas in which the amount of impurity components is small, and that can maintain sufficiently high gas permeability even when the separation treatment is performed over a long period of time, and a gas separation module and a gas separation apparatus each having the gas separation membrane. Another object of the present invention is to provide a functional polyimide compound suitable for application to a gas separation layer of the gas separation membrane.

The above objects of the present invention are achieved by the following means.

[1]

A gas separation membrane has a gas separation layer containing a polyimide compound.

The polyimide compound includes a repeating unit represented by formula (I).

(I)

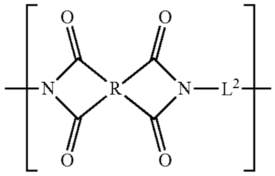

In formula (I), R represents a group represented by any one of formulae (I-1) to (I-28), where $X^1$ to $X^3$ each represent a single bond or a divalent linking group, L represents —CH═CH— or —$CH_2$—, and $R^1$ and $R^2$ each represent a hydrogen atom or a substituent.

(I-1)

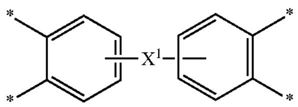

(I-2)

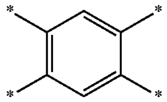

(I-3)

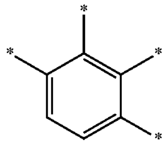

(I-4)

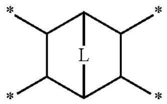

(I-5)

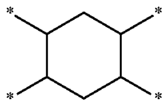

(I-6)

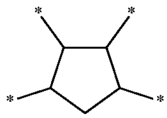

(I-7)

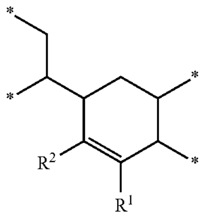

-continued (I-8)

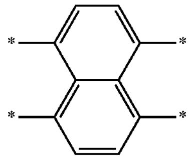

(I-9)

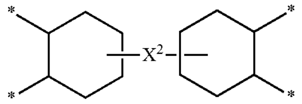

(I-10)

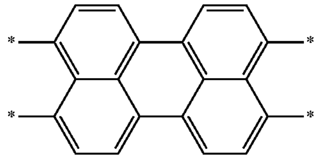

(I-11)

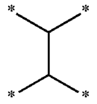

(I-12)

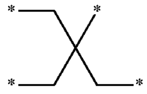

(I-13)

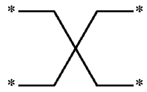

(I-14)

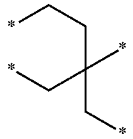

(I-15)

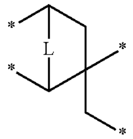

(I-16)

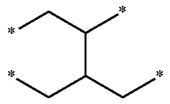

(I-17)

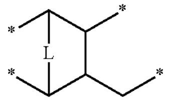

(I-18)

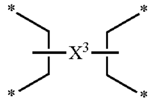

(I-19)

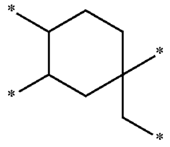

-continued (I-20)

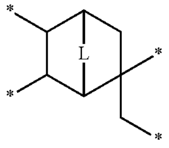

(I-21)

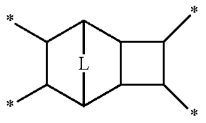

(I-22)

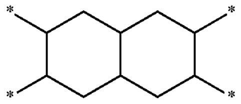

(I-23)

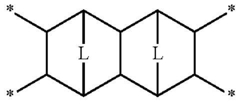

(I-24)

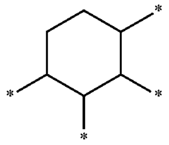

(I-25)

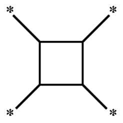

(I-26)

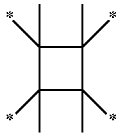

(I-27)

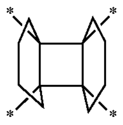

(I-28)

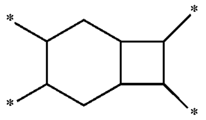

In formula (I), $L^2$ represents a group represented by any one of formulae (II-1) to (II-3).

(II-1)

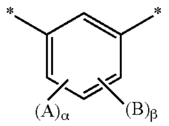

-continued (II-2)

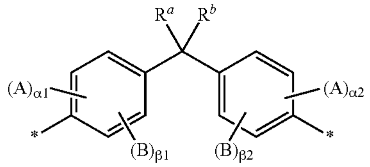

(II-3)

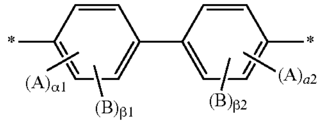

In formulae (II-1) to (II-3), A represents a group represented by any one of formulae (III-1) to (III-8), and B represents unsubstituted methyl, unsubstituted ethyl, unsubstituted n-propyl, unsubstituted i-propyl, a fluorine-substituted alkyl group having 1 to 5 carbon atoms, a fluorine-substituted acyl group having 2 to 6 carbon atoms, or a halogen atom.

(III-1)

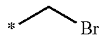

(III-2)

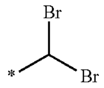

(III-3)

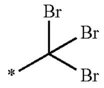

(III-4)

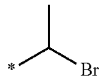

(III-5)

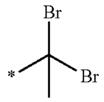

(III-6)

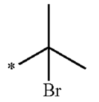

(III-7)

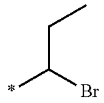

(III-8)

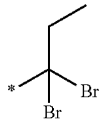

α and β in formula (II-1) are integers satisfying (a), and α1, β1, α2, and β2 in formulae (II-2) and (II-3) are integers satisfying (b).

$$1 \leq \alpha \leq 4,\ 0 \leq \beta \leq 3,\ 2 \leq \alpha+\beta \leq 4 \qquad (a)$$

$$1 \leq \alpha 1+\alpha 2 \leq 8,\ 0 \leq \beta 1+\beta 2 \leq 7,\ 2 \leq \alpha 1+\alpha 2+\beta 1+\beta 2 \leq 8 \qquad (b)$$

$R^a$ and $R^b$ in formula (II-2) each represent a hydrogen atom, unsubstituted methyl, unsubstituted ethyl, unsubstituted n-propyl, unsubstituted i-propyl, or a fluorine-substituted alkyl group having 1 to 5 carbon atoms.

In each formula, * represents a bonding site.

The repeating unit represented by formula (I) has, in at least one of R or $L^2$, at least one of unsubstituted ethyl, unsubstituted n-propyl, unsubstituted i-propyl, the group represented by formula (III-4), the group represented by formula (III-5), the group represented by formula (III-6), the group represented by formula (III-7), the group represented by formula (III-8), a fluorine-substituted alkyl group having 1 to 5 carbon atoms, or a fluorine-substituted acyl group having 2 to 6 carbon atoms.

[2]

In the gas separation membrane according to [1], the groups represented by formulae (II-1) to (II-3) each have a fluorine-substituted alkyl group having 1 to 5 carbon atoms.

[3]

In the gas separation membrane according to [1] or [2], the groups represented by formulae (II-1) to (II-3) each have at least one of unsubstituted ethyl, the group represented by formula (III-4), or the group represented by formula (III-5).

[4]

In the gas separation membrane according to any one of [1] to [3], the gas separation membrane is a gas separation composite membrane having the gas separation layer on an upper side or a lower side of a gas-permeable support layer.

[5]

The gas separation membrane according to any one of [1] to [4] is used for selective permeation of carbon dioxide in a gas including carbon dioxide and methane.

[6]

A gas separation module has the gas separation membrane according to any one of [1] to [5]

[7]

A gas separation apparatus has the gas separation membrane according to any one of [1] to [5].

[8]

A polyimide compound includes a repeating unit represented by formula (I).

(I)

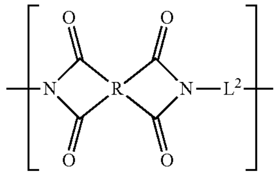

In formula (I), R represents a group represented by any one of formulae (I-1) to (I-28), where $X^1$ to $X^3$ each represent a single bond or a divalent linking group, L represents —CH═CH— or —$CH_2$—, and $R^1$ and $R^2$ each represent a hydrogen atom or a substituent.

(I-1)

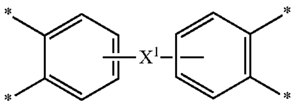

(I-2)

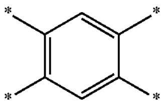

-continued (I-3)

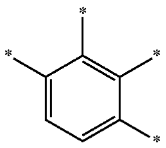

(I-4)

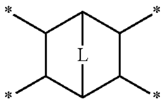

(I-5)

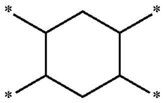

(I-6)

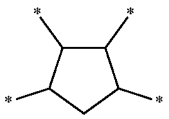

(I-7)

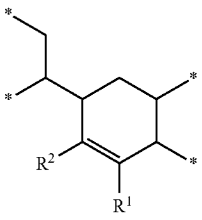

(I-8)

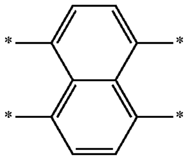

(I-9)

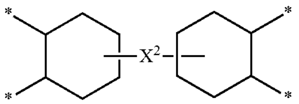

(I-10)

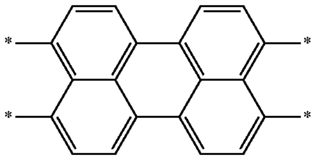

(I-11)

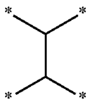

(I-12)

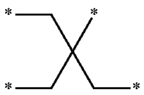

(I-13)

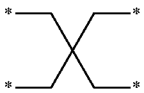

-continued (I-14)

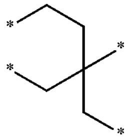

(I-15)

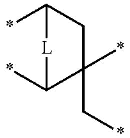

(I-16)

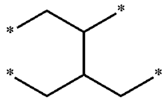

(I-17)

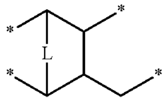

(I-18)

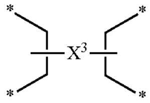

(I-19)

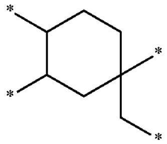

(I-20)

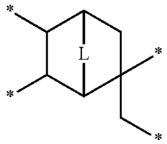

(I-21)

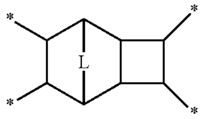

(I-22)

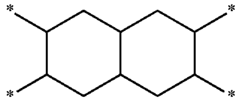

(I-23)

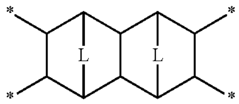

(I-24)

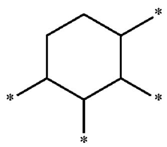

(I-25)

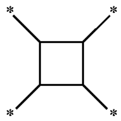

-continued (I-26)

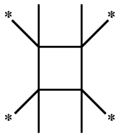

(I-27)

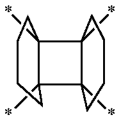

(I-28)

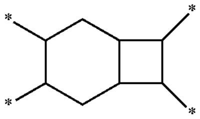

In formula (I), $L^2$ represents a group represented by any one of formulae (II-1) to (II-3).

(II-1)

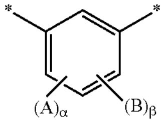

(II-2)

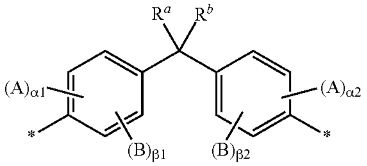

(II-3)

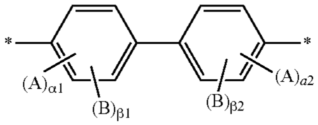

In formulae (II-1) to (II-3), A represents a group represented by any one of formulae (III-1) to (III-8), and B represents unsubstituted methyl, unsubstituted ethyl, unsubstituted n-propyl, unsubstituted i-propyl, a fluorine-substituted alkyl group having 1 to 5 carbon atoms, a fluorine-substituted acyl group having 2 to 6 carbon atoms, or a halogen atom.

(III-1)

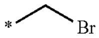

(III-2)

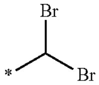

(III-3)

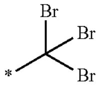

(III-4)

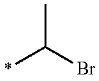

-continued (III-5)

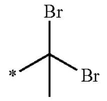

(III-6)

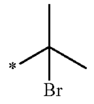

(III-7)

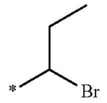

(III-8)

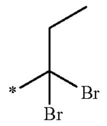

α and β in formula (II-1) are integers satisfying (a), and α1, β1, α2, and β2 in formulae (II-2) and (II-3) are integers satisfying (b).

$$1 \leq \alpha \leq 4,\ 0 \leq \beta \leq 3,\ 2 \leq \alpha+\beta \leq 4 \quad (a)$$

$$1 \leq \alpha 1+\alpha 2 \leq 8,\ 0 \leq \beta 1+\beta 2 \leq 7,\ 2 \leq \alpha 1+\alpha 2+\beta 1+\beta 2 \leq 8 \quad (b)$$

$R^a$ and $R^b$ in formula (II-2) each represent a hydrogen atom, unsubstituted methyl, unsubstituted ethyl, unsubstituted n-propyl, unsubstituted i-propyl, or a fluorine-substituted alkyl group having 1 to 5 carbon atoms.

In each formula, * represents a bonding site.

The repeating unit represented by formula (I) has, in $L^2$, at least one of unsubstituted ethyl, unsubstituted n-propyl, unsubstituted i-propyl, the group represented by formula (III-4), the group represented by formula (III-5), the group represented by formula (III-6), the group represented by formula (III-7), the group represented by formula (III-8), a fluorine-substituted alkyl group having 1 to 5 carbon atoms, or a fluorine-substituted acyl group having 2 to 6 carbon atoms.

In this specification, every numerical range expressed using "to" is meant to include numerical values before and after "to" as the lower and upper limits.

In this specification, when a plurality of substituents, linking groups, or the like (hereinafter referred to as "substituents or the like") are represented by a particular symbol or when a plurality of substituents or the like are simultaneously or alternatively defined, it is meant that the substituents or the like may be the same or different from each other. This also applies to the definition of the number of substituents or the like. When a polymer has a plurality of constituent components represented in the same manner (represented by the same general formula), the constituent components may be the same or different from each other.

In this specification, it is meant that substituents (as well as linking groups) not explicitly stated as substituted or unsubstituted may have any substituent as long as desired effects are not impaired. This also applies to compounds not explicitly stated as substituted or unsubstituted.

The gas separation membrane, the gas separation module, and the gas separation apparatus according to the present invention have high gas permeability and high gas separation selectivity, exhibit stable gas permeability at an early stage even when used for separation treatment of a mixed gas in which the amount of impurity components is small, and can maintain sufficiently high gas permeability even when the separation treatment is performed over a long period of time. The polyimide compound according to the present invention can be used as a constituent material of the gas separation layer of the gas separation membrane and as various functional polymers.

DESCRIPTION OF THE PREFERRED EMBODIMENTS

Figure 1:
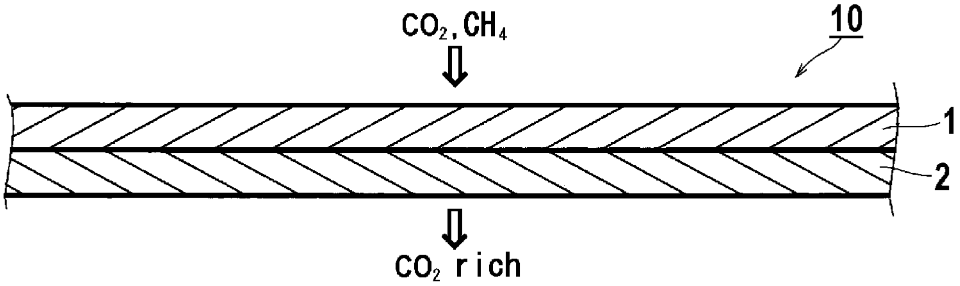
FIG. 1 is a sectional view schematically showing a gas separation composite membrane according to an embodiment of the present invention.

Preferred embodiments of the present invention will be described.

Polyimide Compound

A polyimide compound according to the present invention includes a repeating unit represented by formula (I) below.

(I)

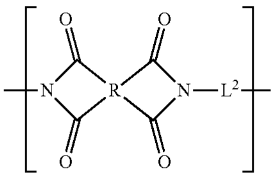

In formula (I), R represents a group represented by any one of formulae (I-1) to (I-28) below.

(I-1)

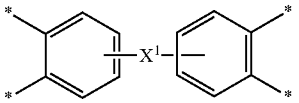

(I-2)

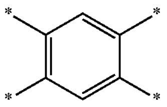

(I-3)

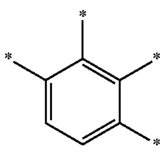

(I-4)

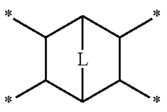

-continued
(I-5)
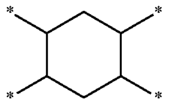
(I-6)
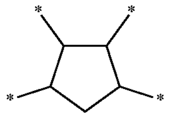
(I-7)
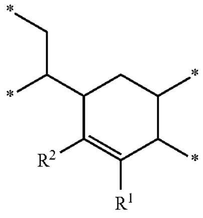
(I-8)
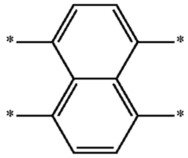
(I-9)
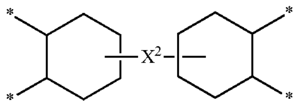
(I-10)
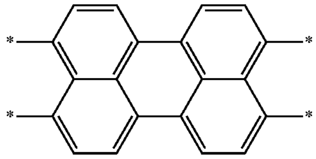
(I-11)
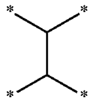
(I-12)
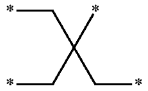
(I-13)
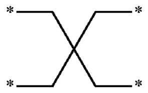
(I-14)
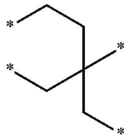
(I-15)
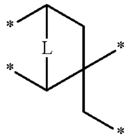
-continued
(I-16)
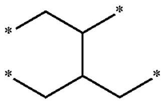
(I-17)
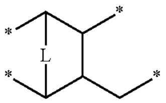
(I-18)
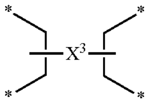
(I-19)
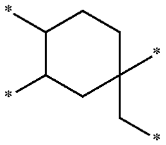
(I-20)
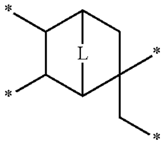
(I-21)
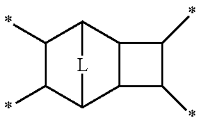
(I-22)
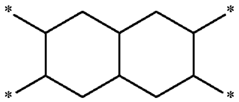
(I-23)
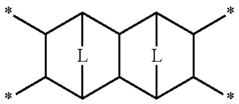
(I-24)
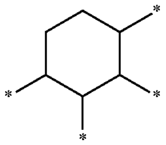
(I-25)
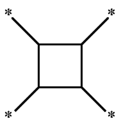
(I-26)
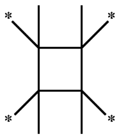
(I-27)
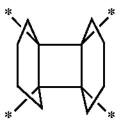

-continued (I-28)

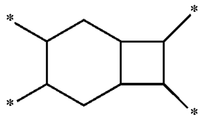

In formulae (I-1) to (I-28), * represents a bonding site.

In formulae (I-1), (I-9), and (I-18), $X^1$ to $X^3$ each represent a single bond or a divalent linking group. The divalent linking group is preferably $—C(R^x)_2—$ (where $R^x$ represents a hydrogen atom or a substituent, and when $R^x$ is a substituent, $R^x$'s may be linked to each other to form a ring), —O—, $—SO_2—$, —C(=O)—, —S—, $—NR^Y—$ (where $R^Y$ is a hydrogen atom, an alkyl group (preferably a methyl group or an ethyl group), or an aryl group (preferably a phenyl group)), $—C_6H_4—$ (a phenylene group), or a combination thereof, more preferably a single bond or $—C(R^x)_2—$. When $R^x$ represents a substituent, specific examples thereof include groups selected from a substituent group Z described later. Among them, alkyl groups (the preferred range thereof is the same as that of alkyl groups shown in the substituent group Z described later) are preferred, alkyl groups having halogen atoms as substituents are more preferred, and trifluoromethyl is particularly preferred. Formula (I-18) means that $X^3$ is linked to one of the two carbon atoms on the left side and one of the two carbon atoms on the right side.

In formulae (I-4), (I-15), (I-17), (I-20), (I-21), and (I-23), L represents —CH=CH— or $—CH_2—$.

In formula (I-7), $R^1$ and $R^2$ each represent a hydrogen atom or a substituent. Examples of the substituent include groups selected from the substituent group Z described later. $R^1$ and $R^2$ may be bonded to each other to form a ring.

$R^1$ and $R^2$ are each preferably a hydrogen atom or an alkyl group, more preferably a hydrogen atom, a methyl group, or an ethyl group, still more preferably a hydrogen atom.

Each of the carbon atoms in formulae (I-1) to (I-28) may further have a substituent as long as the effects of the present invention are not impaired. In the present invention, such a configuration having a substituent is also included in the group represented by any one of formulae (I-1) to (I-28). Specifically, for example, this substituent is a group selected from the substituent group Z described later, and is preferably an alkyl group or an aryl group.

In formula (I), $L^2$ represents a group represented by any one of formulae (II-1) to (II-3) below.

(II-1)

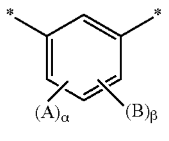

(II-2)

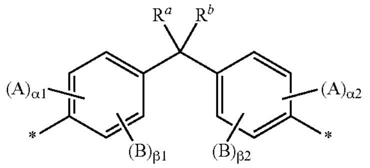

(II-3)

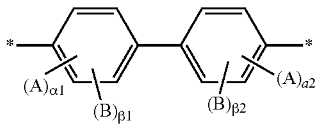

In formulae (II-1) to (II-3), A represents a group represented by any one of formulae (III-1) to (III-8) below, and B represents unsubstituted methyl, unsubstituted ethyl, unsubstituted n-propyl, unsubstituted i-propyl, a fluorine-substituted alkyl group having 1 to 5 carbon atoms, a fluorine-substituted acyl group having 2 to 6 carbon atoms, or a halogen atom.

(III-1)

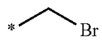

(III-2)

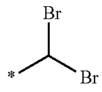

(III-3)

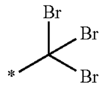

(III-4)

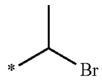

(III-5)

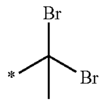

(III-6)

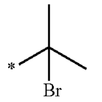

(III-7)

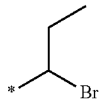

(III-8)

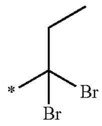

In formulae (II-1) to (II-3) and (III-1) to (III-8), * represents a bonding site.

A preferably represents a group represented by any one of formulae (III-1) to (III-5) (i.e., bromine-substituted methyl or bromine-substituted ethyl), more preferably represents a group represented by any one of formulae (III-1) to (III-3) (bromine-substituted methyl).

B represents unsubstituted methyl, unsubstituted ethyl, unsubstituted n-propyl, unsubstituted i-propyl, a fluorine-substituted alkyl group having 1 to 5 carbon atoms, a fluorine-substituted acyl group having 2 to 6 carbon atoms, or a halogen atom.

The fluorine-substituted alkyl group having 1 to 5 carbon atoms may be a $C_1$ to $C_5$ perfluoroalkyl group in which all of the hydrogen atoms of the alkyl group are substituted with fluorine atoms or may be a $C_1$ to $C_5$ fluoroalkyl group in which some of the hydrogen atoms of the alkyl group are substituted with fluorine atoms. The fluorine-substituted alkyl group having 1 to 5 carbon atoms may be linear, branched, or cyclic, and is preferably linear or branched, more preferably linear. The fluorine-substituted alkyl group having 1 to 5 carbon atoms has preferably 1 to 4 carbon atoms, more preferably 1 to 3 carbon atoms, still more preferably 1 or 2 carbon atoms.

The fluorine-substituted alkyl group having 1 to 5 carbon atoms is preferably a perfluoroalkyl group, more preferably trifluoromethyl or pentafluoroethyl, still more preferably trifluoromethyl.

In the fluorine-substituted acyl group having 2 to 6 carbon atoms, all of the hydrogen atoms of the acyl group may be substituted with fluorine atoms, or some of the hydrogen atoms of the acyl group may be substituted with fluorine atoms. The alkyl group of the fluorine-substituted acyl group having 2 to 6 carbon atoms may be linear, branched, or cyclic, and is preferably linear or branched, more preferably linear. The fluorine-substituted acyl group having 2 to 6 carbon atoms has preferably 2 to 4 carbon atoms, more preferably 2 or 3 carbon atoms, still more preferably 2 carbon atoms.

The fluorine-substituted acyl group having 2 to 6 carbon atoms preferably has a perfluoroalkyl group having 1 to 5 carbon atoms, and is more preferably trifluoroacetyl.

Examples of the halogen atom include a fluorine atom, a chlorine atom, a bromine atom, and an iodine atom.

a and (3 in formula (II-1) are integers satisfying (a) below, and $\alpha1$, $\beta1$, $\alpha2$, and $\beta2$ in formulae (II-2) and (II-3) are integers satisfying (b) below.

$$1 \leq \alpha \leq 4,\ 0 \leq \beta \leq 3,\ 2 \leq \alpha+\beta \leq 4 \qquad (a)$$

$$1 \leq \alpha1+\alpha2 \leq 8,\ 0 \leq \beta1+\beta2 \leq 7,\ 2 \leq \alpha1+\alpha2+\beta1+\beta2 \leq 8 \qquad (b)$$

The only substituents that the benzene rings shown in formulae (II-1) to (II-3) can have are A and B above. That is, the benzene rings shown in formulae (II-1) to (II-3) have no substituent other than A and B above.

$R^a$ and $R^b$ in formula (II-2) each represent a hydrogen atom, unsubstituted methyl, unsubstituted ethyl, unsubstituted n-propyl, unsubstituted i-propyl, or a fluorine-substituted alkyl group having 1 to 5 carbon atoms. $R^a$ and $R^b$ are each preferably a hydrogen atom or unsubstituted methyl.

Furthermore, the repeating unit represented by formula (I) has, in at least one of R or $L^2$, at least one of unsubstituted ethyl, unsubstituted n-propyl, unsubstituted i-propyl, the group represented by formula (III-4), the group represented by formula (III-5), the group represented by formula (III-6), the group represented by formula (III-7), the group represented by formula (III-8), a fluorine-substituted alkyl group having 1 to 5 carbon atoms, or a fluorine-substituted acyl group having 2 to 6 carbon atoms, and preferably has the fluorine-substituted alkyl group having 1 to 5 carbon atoms. The fluorine-substituted alkyl group having 1 to 5 carbon atoms and the fluorine-substituted acyl group having 2 to 6 carbon atoms respectively have the same meanings as the fluorine-substituted alkyl group having 1 to 5 carbon atoms and the fluorine-substituted acyl group having 2 to 6 carbon atoms that can be represented by B above, and preferred forms are also the same. It is also preferred that the repeating unit represented by formula (I) have trifluoromethyl in both R and $L^2$. It is also preferred that the repeating unit represented by formula (I) have, in at least $L^2$, at least one of the unsubstituted ethyl, the group represented by formula (III-4), the group represented by formula (III-5), the fluorine-substituted alkyl group having 1 to 5 carbon atoms, or the fluorine-substituted acyl group having 2 to 6 carbon atoms.

When $L^2$ has unsubstituted ethyl, unsubstituted n-propyl, unsubstituted i-propyl, a fluorine-substituted alkyl group having 1 to 5 carbon atoms, or a fluorine-substituted acyl group having 2 to 6 carbon atoms, these groups are preferably included as substituents B in formulae (II-1) to (II-3).

In the polyimide compound according to the present invention, the content of the repeating unit represented by formula (I) is preferably 20% by mass or more, more preferably 30% by mass or more, still more preferably 40% by mass or more. It is also preferred that the polyimide compound used in the present invention be constituted by the repeating unit represented by formula (I).

The polyimide compound may have at least one of repeating units represented by formulae (IV) and (V) below in addition to the constitutional unit represented by formula (I). It should be noted, however, that the repeating units represented by formulae (IV) and (V) do not include those included in the repeating unit represented by formula (I). The polyimide compound may contain one or more repeating units represented by formula (IV) or (V). The polyimide compound according to the present invention can be provided with a desired function by using the repeating unit represented by formula (IV) or (V).

(IV)

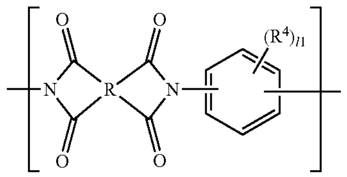

(V)

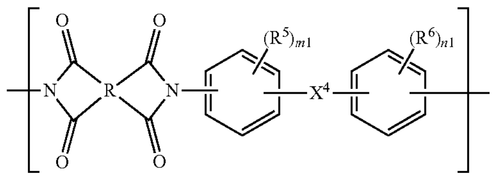

In formulae (IV) and (V), R has the same meaning as R in formula (I), and preferred forms are also the same. $R^4$ to $R^6$ each represent a substituent. Examples of the substituent include groups selected from the substituent group Z described later.

$R^4$ is preferably an alkyl group, a carboxy group, a sulfamoyl group, a carbamoyl group, or a halogen atom. 11 indicating the number of $R^4$ is an integer of 0 to 4. When $R^4$ is an alkyl group, the number of carbon atoms of the alkyl group is preferably 1 to 10, more preferably 1 to 5, still more preferably 1 to 3, and the alkyl group is particularly preferably a methyl group, an ethyl group, or a trifluoromethyl group. The repeating unit of formula (IV) preferably has a carboxy group or a sulfamoyl group. When the constitutional unit of (IV) has a carboxy or sulfamoyl group, the number of carboxy or sulfamoyl groups in formula (IV) is preferably one.

In formula (IV), two linking sites of a diamine component (i.e., a phenylene group that may have $R^4$) that are used for incorporation into the polyimide compound are preferably located at meta positions or para positions with respect to each other, more preferably located at meta positions with respect to each other.

Preferably, $R^5$ and $R^6$ each represent an alkyl group or a halogen atom or represent groups that are linked to each other to form a ring together with $X^4$. Alternatively, two $R^5$'s may be linked to each other to form a ring, or two $R^6$'s may be linked to each other to form a ring. The structure in which $R^5$ and $R^6$ are linked is not particularly limited and is preferably a single bond, —O—, or —S—. m1 and n1 indicating the numbers of $R^5$ and $R^6$, respectively, are each an integer of 0 to 4, preferably 0 to 3, more preferably 0 to 2, still more preferably 0 or 1. When $R^5$ and $R^6$ are each an alkyl group, the number of carbon atoms of the alkyl group is preferably 1 to 10, more preferably 1 to 5, still more preferably 1 to 3, and the alkyl group is particularly preferably a methyl group, an ethyl group, or a trifluoromethyl group.

In formula (V), two linking sites of two phenylene groups (i.e., two phenylene groups that may have $R^5$ and $R^6$) in a diamine component that are used for incorporation into the polyimide compound are preferably located at meta positions or para positions with respect to the linking sites of $X^4$.

$X^4$ has the same meaning as $X^1$ in formula (I-1), and preferred forms are also the same.

In the structure of the polyimide compound according to the present invention, the proportion of the molar amount of the repeating unit represented by formula (I) to the total molar amount of the repeating unit represented by formula (I), the repeating unit represented by formula (IV), and the repeating unit represented by formula (V) is preferably 20 to 100 mol %, more preferably 30 to 100 mol %, still more preferably 40 to 100 mol %.

The proportion of the molar amount of the repeating unit represented by formula (I) may be 90 mol % or less or 80 mol % or less. When the proportion of the molar amount of the repeating unit represented by formula (I) to the total molar amount of the repeating unit represented by formula (I), the repeating unit represented by formula (IV), and the repeating unit represented by formula (V) is 100 mol %, it means that the polyimide compound has neither the repeating unit represented by formula (IV) nor the repeating unit represented by formula (V).

Preferably, the polyimide compound according to the present invention is constituted by the repeating unit represented by formula (I), or when a repeating unit other than the repeating unit represented by formula (I) is contained, the remainder except for the repeating unit represented by formula (I) is constituted by at least one repeating unit represented by formula (IV) or formula (V). Here, the phrase "constituted by at least one repeating unit represented by formula (IV) or formula (V)" is meant to include the following three forms: the form constituted by the constitutional unit represented by formula (IV), the form constituted by the constitutional unit represented by formula (V), and the form constituted by the constitutional unit represented by formula (IV) and the constitutional unit represented by formula (V).

Substituent Group Z:

Examples include alkyl groups (alkyl groups having preferably 1 to 30 carbon atoms, more preferably 1 to 20 carbon atoms, still more preferably 1 to 10 carbon atoms, such as methyl, ethyl, iso-propyl, tert-butyl, n-octyl, n-decyl, and n-hexadecyl), cycloalkyl groups (cycloalkyl groups having preferably 3 to 30 carbon atoms, more preferably 3 to 20 carbon atoms, still more preferably 3 to 10 carbon atoms, such as cyclopropyl, cyclopentyl, and cyclohexyl), alkenyl groups (alkenyl groups having preferably 2 to 30 carbon atoms, more preferably 2 to 20 carbon atoms, still more preferably 2 to 10 carbon atoms, such as vinyl, allyl, 2-butenyl, and 3-pentenyl), alkynyl groups (alkynyl groups having preferably 2 to 30 carbon atoms, more preferably 2 to 20 carbon atoms, still more preferably 2 to 10 carbon atoms, such as propargyl and 3-pentynyl), aryl groups (aryl groups having preferably 6 to 30 carbon atoms, more preferably 6 to 20 carbon atoms, still more preferably 6 to 12 carbon atoms, such as phenyl, p-methylphenyl, naphthyl, and anthranil), amino groups (including amino groups, alkylamino groups, arylamino groups, and heterocyclic amino groups; amino groups having preferably 0 to 30 carbon atoms, more preferably 0 to 20 carbon atoms, still more preferably 0 to 10 carbon atoms, such as amino, methylamino, dimethylamino, diethylamino, dibenzylamino, diphenylamino, and ditolylamino), alkoxy groups (alkoxy groups having preferably 1 to 30 carbon atoms, more preferably 1 to 20 carbon atoms, still more preferably 1 to 10 carbon atoms, such as methoxy, ethoxy, butoxy, and 2-ethylhexyloxy), aryloxy groups (aryloxy groups having preferably 6 to 30 carbon atoms, more preferably 6 to 20 carbon atoms, still more preferably 6 to 12 carbon atoms, such as phenyloxy, 1-naphthyloxy, and 2-naphthyloxy), heterocyclic oxy groups (heterocyclic oxy groups having preferably 1 to 30 carbon atoms, more preferably 1 to 20 carbon atoms, still more preferably 1 to 12 carbon atoms, such as pyridyloxy, pyrazyloxy, pyrimidyloxy, and quinolyloxy);

acyl groups (acyl groups having preferably 1 to 30 carbon atoms, more preferably 1 to 20 carbon atoms, still more preferably 1 to 12 carbon atoms, such as acetyl, benzoyl, formyl, and pivaloyl), alkoxycarbonyl groups (alkoxycarbonyl groups having preferably 2 to 30 carbon atoms, more preferably 2 to 20 carbon atoms, still more preferably 2 to 12 carbon atoms, such as methoxycarbonyl and ethoxycarbonyl), aryloxycarbonyl groups (aryloxycarbonyl groups having preferably 7 to 30 carbon atoms, more preferably 7 to 20 carbon atoms, still more preferably 7 to 12 carbon atoms, such as phenyloxycarbonyl), acyloxy groups (acyloxy groups having preferably 2 to 30 carbon atoms, more preferably 2 to 20 carbon atoms, still more preferably 2 to 10 carbon atoms, such as acetoxy and benzoyloxy), acylamino groups (acylamino groups having preferably 2 to 30 carbon atoms, more preferably 2 to 20 carbon atoms, still more preferably 2 to 10 carbon atoms, such as acetylamino and benzoylamino);

alkoxycarbonylamino groups (alkoxycarbonylamino groups having preferably 2 to 30 carbon atoms, more preferably 2 to 20 carbon atoms, still more preferably 2 to 12 carbon atoms, such as methoxycarbonylamino), aryloxycarbonylamino groups (aryloxycarbonylamino groups having preferably 7 to 30 carbon atoms, more preferably 7 to 20 carbon atoms, still more preferably 7 to 12 carbon atoms, such as phenyloxycarbonylamino), sulfonylamino groups (sulfonylamino groups having preferably 1 to 30 carbon atoms, more preferably 1 to 20 carbon atoms, still more preferably 1 to 12 carbon atoms, such as methanesulfonylamino and benzenesulfonylamino), sulfamoyl groups (sulfamoyl groups having preferably 0 to 30 carbon atoms, more preferably 0 to 20 carbon atoms, still more preferably 0 to 12 carbon atoms, such as sulfamoyl, methylsulfamoyl, dimethylsulfamoyl, and phenylsulfamoyl);

alkylthio groups (alkylthio groups having preferably 1 to 30 carbon atoms, more preferably 1 to 20 carbon atoms, still more preferably 1 to 12 carbon atoms, such as methylthio and ethylthio), arylthio groups (arylthio groups having preferably 6 to 30 carbon atoms, more preferably 6 to 20 carbon atoms, still more preferably 6 to 12 carbon atoms, such as phenylthio), heterocyclic thio groups (heterocyclic thio groups having preferably 1 to 30 carbon atoms, more preferably 1 to 20 carbon atoms, still more preferably 1 to 12 carbon atoms, such as pyridylthio, 2-benzimizolylthio, 2-benzoxazolylthio, and 2-benzothiazolylthio);

sulfonyl groups (sulfonyl groups having preferably 1 to 30 carbon atoms, more preferably 1 to 20 carbon atoms, still more preferably 1 to 12 carbon atoms, such as mesyl and tosyl), sulfinyl groups (sulfinyl groups having preferably 1 to 30 carbon atoms, more preferably 1 to 20 carbon atoms, still more preferably 1 to 12 carbon atoms, such as methanesulfinyl and benzenesulfinyl), ureido groups (ureido groups having preferably 1 to 30 carbon atoms, more preferably 1 to 20 carbon atoms, still more preferably 1 to 12 carbon atoms, such as ureido, methylureido, and phenylureido), phosphoramide groups (phosphoramide groups having preferably 1 to 30 carbon atoms, more preferably 1 to 20 carbon atoms, still more preferably 1 to 12 carbon atoms, such as diethylphosphoramide and phenylphosphoramide), a hydroxy group, a mercapto group, halogen atoms (such as a fluorine atom, a chlorine atom, a bromine atom, and an iodine atom, more preferably a fluorine atom); and a cyano group, a carboxy group, an oxo group, a nitro group, a hydroxamic acid group, a sulfino group, a hydrazino group, an imino group, heterocyclic groups (3- to 7-membered ring heterocyclic groups are preferred, the heterocycle may be aromatic or non-aromatic, examples of heteroatoms constituting the heterocycle include a nitrogen atom, an oxygen atom, and a sulfur atom, the number of carbon atoms in each heterocyclic group is preferably 0 to 30, more preferably 1 to 12, and specific examples include imidazolyl, pyridyl, quinolyl, furyl, thienyl, piperidyl, morpholino, benzoxazolyl, benzimidazolyl, benzothiazolyl, carbazolyl, and azepinyl), silyl groups (silyl groups having preferably 3 to 40 carbon atoms, more preferably 3 to 30 carbon atoms, still more preferably 3 to 24 carbon atoms, such as trimethylsilyl and triphenylsilyl), and silyloxy groups (silyloxy groups having preferably 3 to 40 carbon atoms, more preferably 3 to 30 carbon atoms, still more preferably 3 to 24 carbon atoms, such as trimethylsilyloxy and triphenylsilyloxy). These substituents may further be substituted with one or more substituents selected from the substituent group Z.

In the present invention, when one structural site has a plurality of substituents, these substituents may be linked together to form a ring or may be fused with a part or the whole of the structural site to form an aromatic ring or an unsaturated heterocyclic ring.

When the compound, the substituent, or the like includes an alkyl group, an alkenyl group, or the like, the group may be linear or branched and may be substituted or unsubstituted. When the compound, the substituent, or the like includes an aryl group, a heterocyclic group, or the like, the group may be monocyclic or fused and may be substituted or unsubstituted.

In this specification, those simply referred to as substituents are selected from the substituent group Z unless otherwise specified. When only the name of a group is stated (e.g., "alkyl group" is simply stated), the preferred range and specific examples of the corresponding group in the substituent group Z are applied.

The polyimide compound according to the present invention exhibits desired characteristics or functions due to the unique structure represented by formula (I). For example, the high free volume of the polyimide increases adsorptivity, transparency, etc. and enables lower permittivity. The reason for this is not clear, but this can be explained in part as follows: due to the presence of a total of two or more substituents A and B described above and the presence of at least one of unsubstituted ethyl, unsubstituted n-propyl, unsubstituted propyl, the group represented by formula (III-4), the group represented by formula (III-5), the group represented by formula (III-6), the group represented by formula (III-7), the group represented by formula (III-8), a fluorine-substituted alkyl group having 1 to 5 carbon atoms, or a fluorine-substituted acyl group having 2 to 6 carbon atoms, the planarity or packing property of the polyimide compound is moderately suppressed.

In addition, the polyimide compound according to the present invention, which has at least one bromine-substituted alkyl group represented by any one of formulae (III-1) to (III-8), can be radically crosslinked, or modified or crosslinked by the action of a nucleophile. Since the physical properties can be changed in this manner, the polyimide compound according to the present invention can be used also as a precursor of a functional polyimide compound having different desired physical properties.

Therefore, the polyimide compound according to the present invention is useful as various functional polyimide compounds or precursors thereof, and is suitable as constituent polymers or precursors thereof for adsorptive materials, transparent heat-resistant materials, low-permittivity materials, materials for high frequency, moisture-proof coating materials, etc.

The polyimide according to the present invention is also suitable as a constituent material of a gas separation layer of a gas separation membrane. Even if a gas in which the amount of plasticizing component is small is subjected to separation treatment over a long period of time, the use of the polyimide according to the present invention allows a desired gas component to permeate at a high rate with high selectivity due to the above-mentioned high free volume. That is, both gas permeability and gas separation selectivity can be achieved at high levels. This gas separation membrane, if used for separation treatment of a gas in which the amount of plasticizing component is small, is less likely to undergo membrane densification over time, and thus exhibits stable gas permeability at an early stage after the start of separation treatment of the gas and can maintain high gas permeability over a long period of time. The reason for this is not clear, but this can be explained in part as follows: bromine atoms bonded to side-chain benzylic positions interact with each other to cause moderately strong intramolecular and intermolecular aggregation of the polyimide compound, thereby sufficiently reducing the mobility.

When a gas separation membrane including a gas separation layer containing the polyimide compound according to the present invention is used in, for example, a gas field where the amount of plasticizing component is large, the physical properties of the gas separation membrane can be changed by radical crosslinking of a brominated moiety or by modification or crosslinking through the action of a nucleophile as described above. That is, by modifying the chemical structure based on the polyimide structure of the present invention, the affinity with a plasticizing component is lowered, or the movement of the polyimide structure is suppressed through crosslinking, whereby the gas separation membrane can be suitably applied to a gas containing a large amount of plasticizing component.

The molecular weight of the polyimide compound according to the present invention is not particularly limited. For example, the weight-average molecular weight may be 1,000 to 1,000,000, and is preferably 10,000 to 500,000, more preferably 20,000 to 300,000.

In this specification, the weight-average molecular weight is measured using gel permeation chromatography (GPC) unless otherwise specified, and the molecular weight is a weight-average molecular weight in terms of polystyrene. The gel packed in columns used in GPC is preferably a gel having an aromatic compound as a repeating unit and is, for example, a gel composed of a styrene-divinylbenzene copolymer. It is preferable to use two to six columns connected to each other. Examples of solvents used include ether solvents such as tetrahydrofuran and amide solvents such as N-methylpyrrolidinone. In the measurement, the solvent flow rate is preferably in the range of 0.1 to 2 mL/min, more preferably in the range of 0.5 to 1.5 mL/min. Within this range, the apparatus is subjected to no load, and the measurement can be performed more efficiently. The measurement temperature is preferably 10° C. to 50° C., more preferably 20° C. to 40° C. The columns and carriers used can be appropriately selected according to the physical properties of a polymer to be measured.

The polyimide compound according to the present invention can be synthesized through condensation polymerization of a tetracarboxylic dianhydride and a diamine compound represented by formula (VI) below. The polyimide compound according to the present invention can be synthesized by a conventional method except for raw materials used. The synthesis can be performed with appropriate reference to general books (e.g., "Latest Polyimides—Fundamentals and Applications—" written and edited by Yoshio Imai and Rikio Yokota, NTS Inc., Aug. 25, 2010, pp. 3 to 49).

(VI)

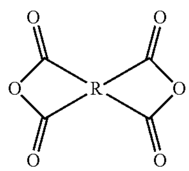

$H_2N—L^2—NH_2$

Here, R and $L^2$ in formula (VI) respectively have the same meanings as R and $L^2$ in formula (I), and preferred forms are also the same. At least one of R or $L^2$ (preferably at least $L^2$)

has at least one of unsubstituted ethyl, unsubstituted n-propyl, unsubstituted i-propyl, the group represented by formula (III-4), the group represented by formula (III-5), the group represented by formula (III-6), the group represented by formula (III-7), the group represented by formula (III-8), a fluorine-substituted alkyl group having 1 to 5 carbon atoms, or a fluorine-substituted acyl group having 2 to 6 carbon atoms.

Alternatively, the polyimide compound according to the present invention can be obtained by synthesizing a polyimide compound serving as a precursor in advance and then brominating the precursor. That is, for example, the polyimide compound according to the present invention can be obtained by preparing a polyimide compound serving as a precursor through condensation polymerization of a tetracarboxylic dianhydride and an aromatic diamine compound having unsubstituted methyl, unsubstituted ethyl, unsubstituted n-propyl, or unsubstituted i-propyl at a ring-constituting carbon atom of an aromatic ring, and then converting the unsubstituted methyl, unsubstituted ethyl, unsubstituted n-propyl, or unsubstituted i-propyl into the above-described substituent A through a bromination reaction. This bromination reaction is a reaction that regioselectively brominates a side-chain benzylic position as described later.

The bromination reaction can be performed by a conventional method. Alternatively, the synthesis can be performed with appropriate reference to MEMBRANE, 31 (1), 6-7 (2006).

Specific examples of the tetracarboxylic dianhydride in formula (VI) for forming the repeating unit represented by formula (I) include those shown below. In the structural formulae below, Ph represents phenyl.

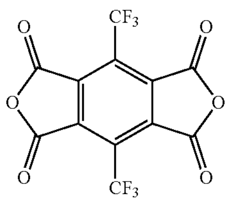

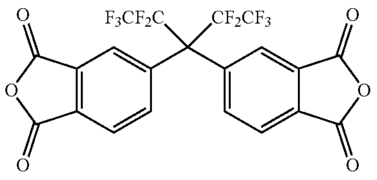

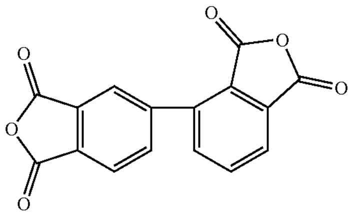

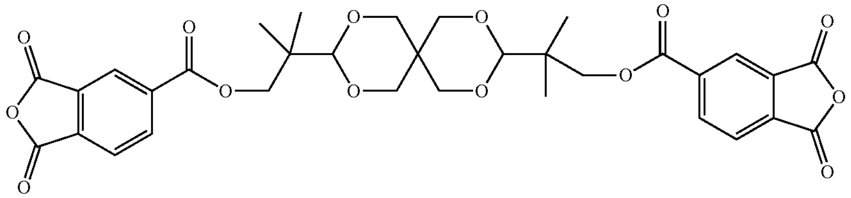

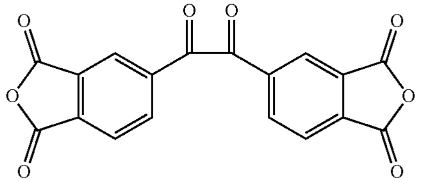

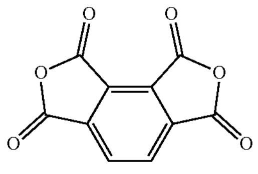

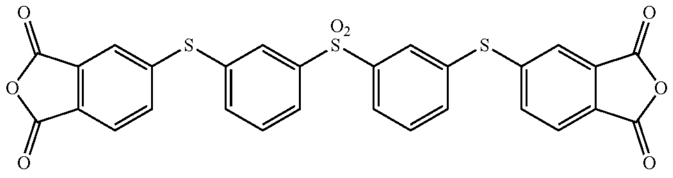

-continued
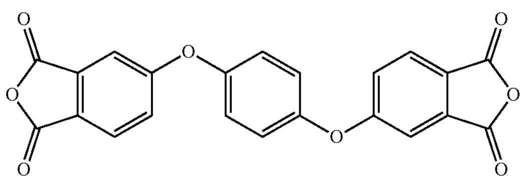
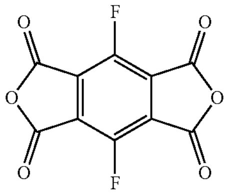
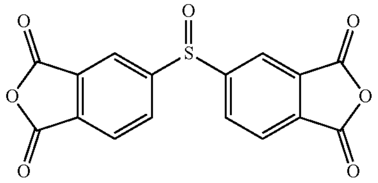
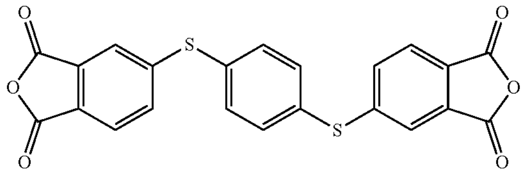
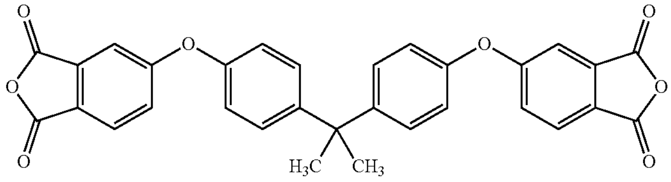
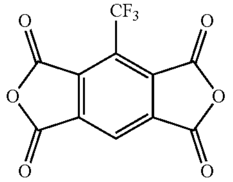
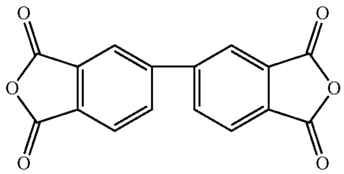
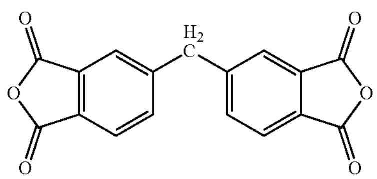
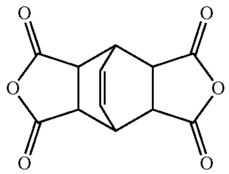
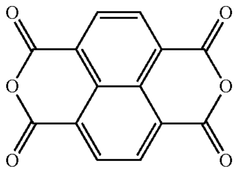
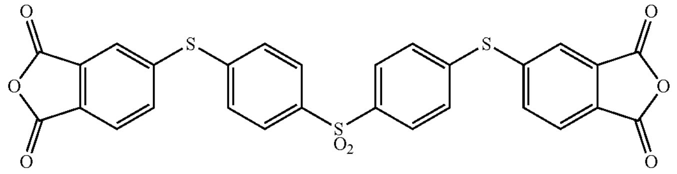
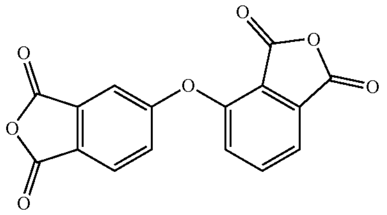
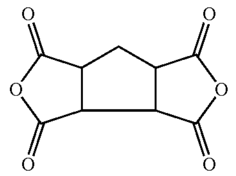
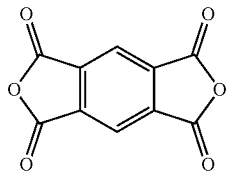
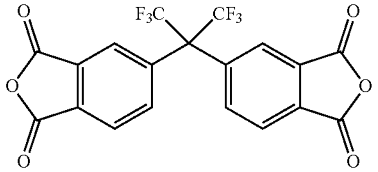
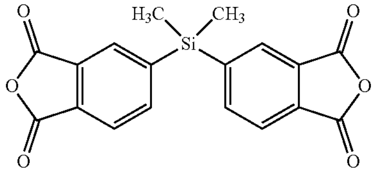
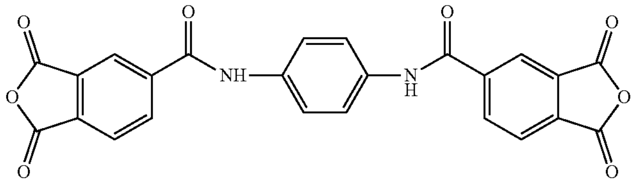
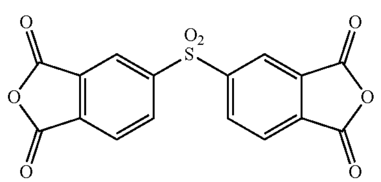
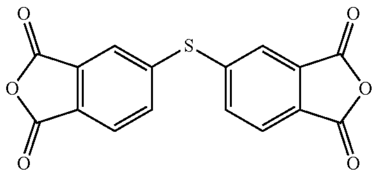
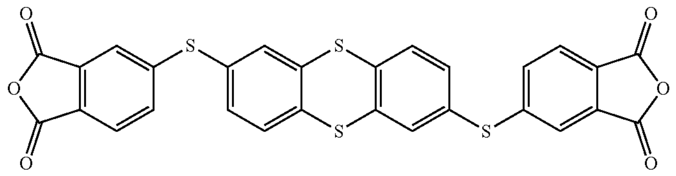

-continued
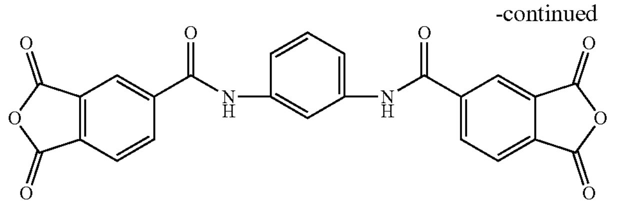
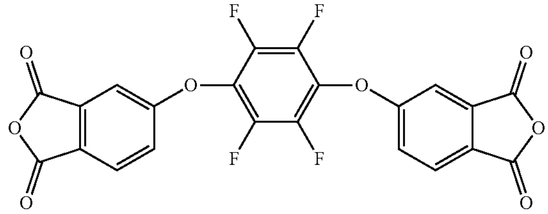
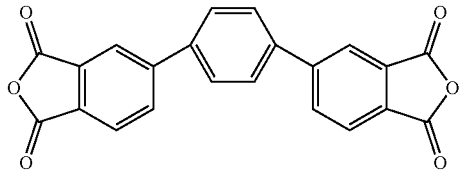
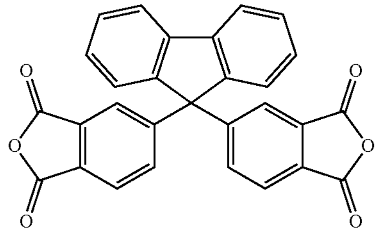
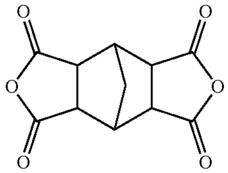
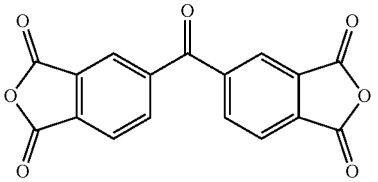
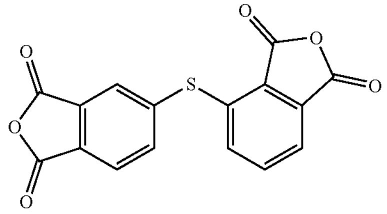
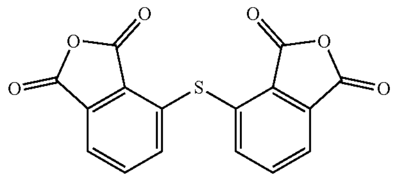
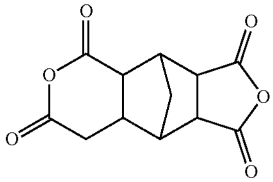
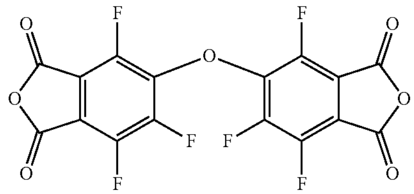
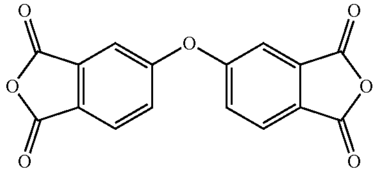
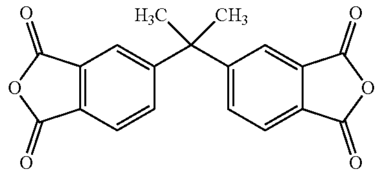
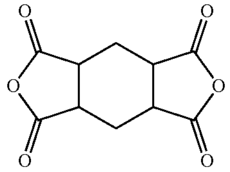
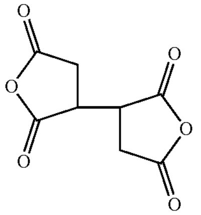
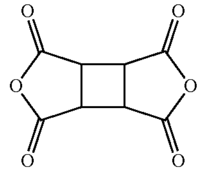
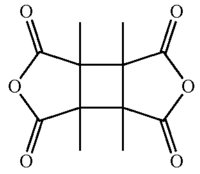
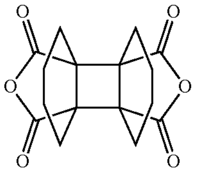
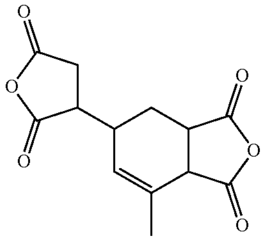
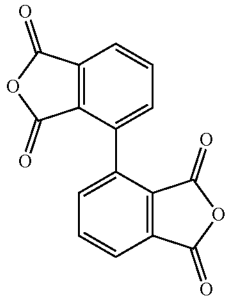
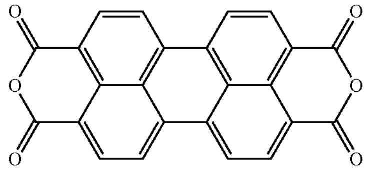
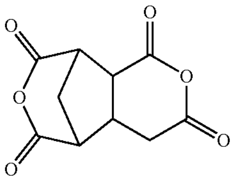
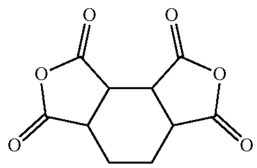

-continued
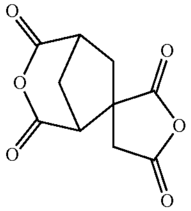
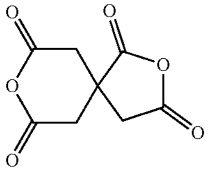
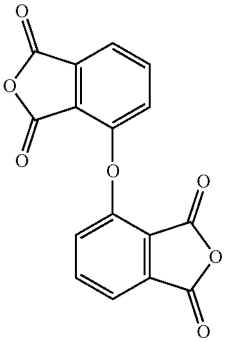
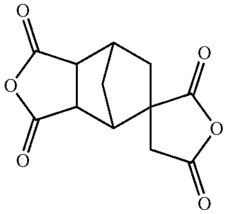
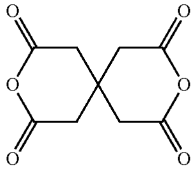
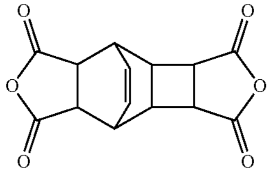
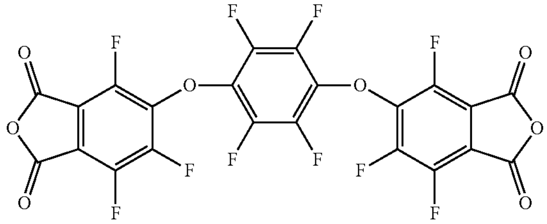
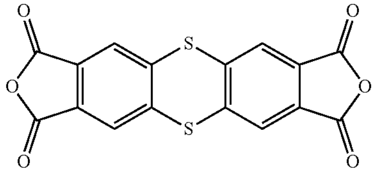
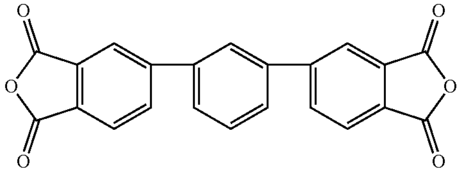
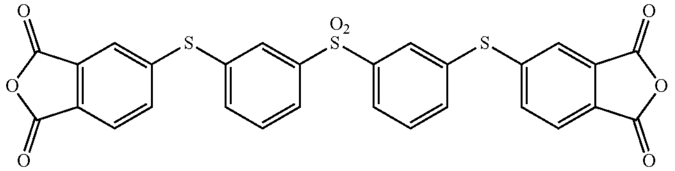
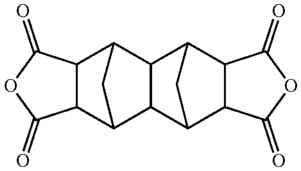
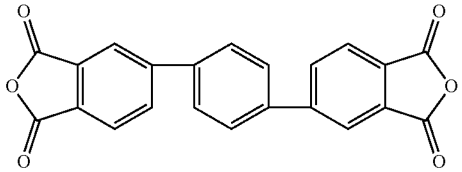
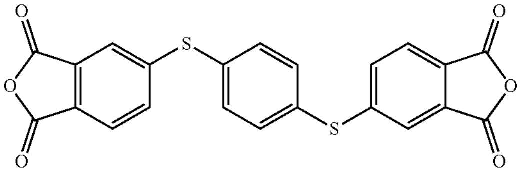
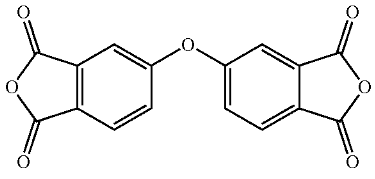
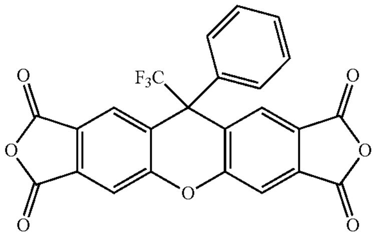
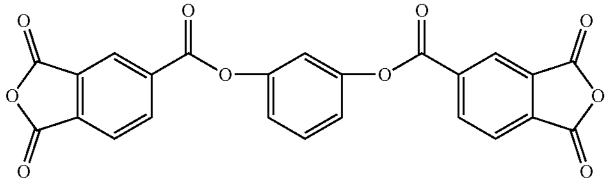
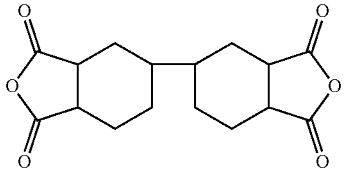
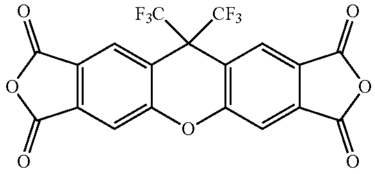
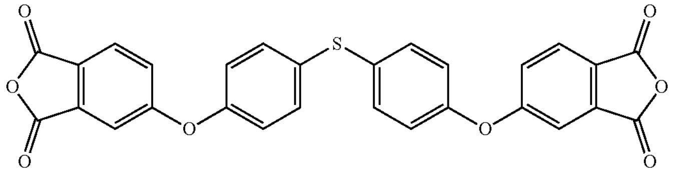

-continued

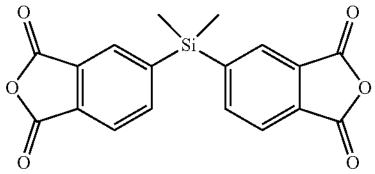
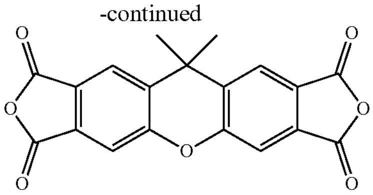
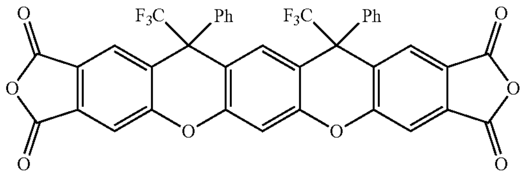
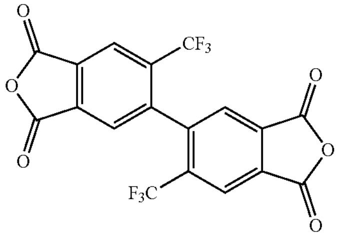
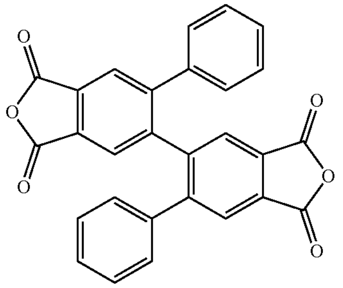

Examples of the diamine compound in formula (VI) for forming the repeating unit represented by formula (I) include compounds obtained by converting unsubstituted methyl (Me), unsubstituted ethyl (Et), unsubstituted n-propyl (Pr), and unsubstituted i-propyl groups in compounds represented by the following structural formulae into the substituents A by partially or completely brominating the groups. The polyimide compound according to the present invention can also be obtained by the above-described alternative method, that is, by preparing a precursor polyimide compound through condensation polymerization of any of the following compounds themselves and a tetracarboxylic dianhydride and then performing a bromination reaction of the precursor polyimide compound.

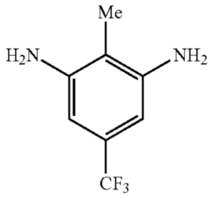
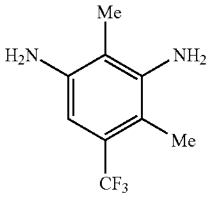
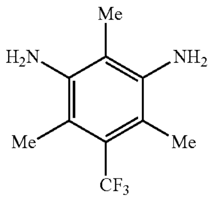
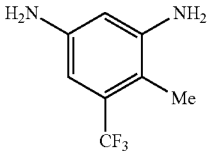

-continued

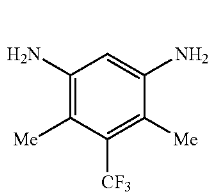
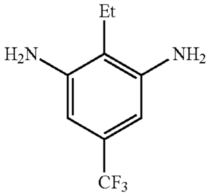
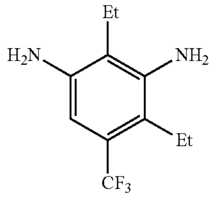
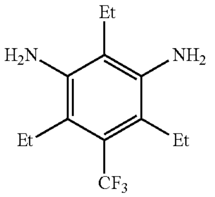
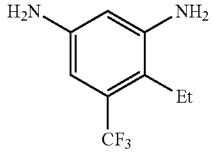
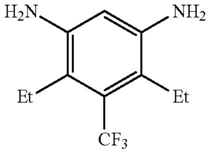
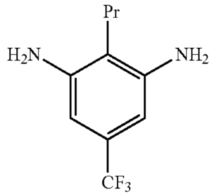
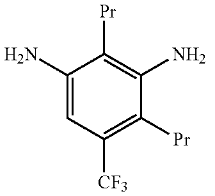
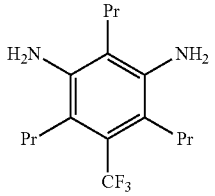
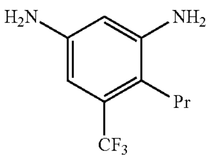

-continued
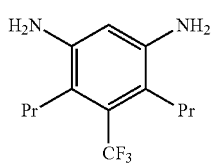
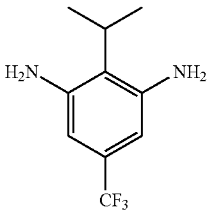
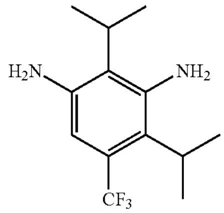
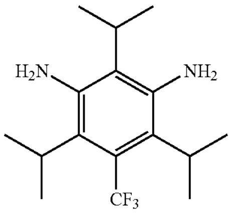
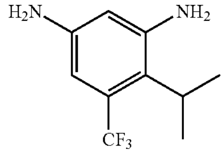
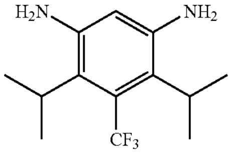
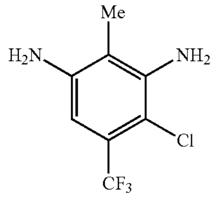
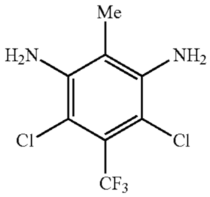
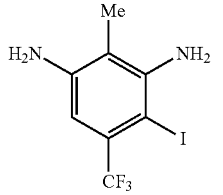
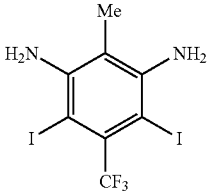
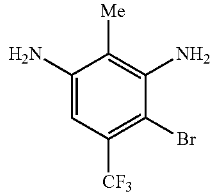
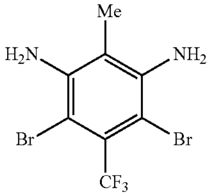
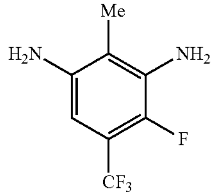
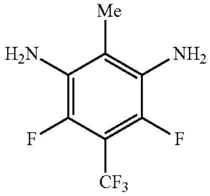
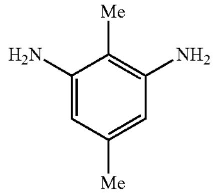
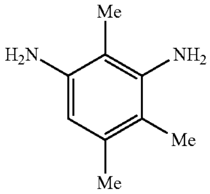
-continued
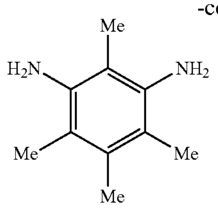
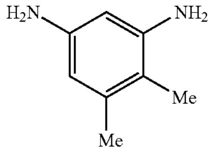
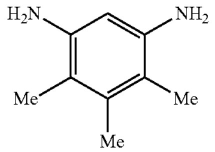
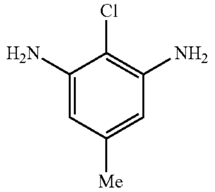
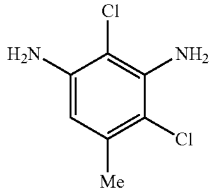
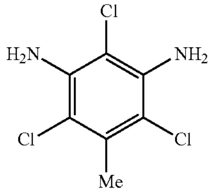
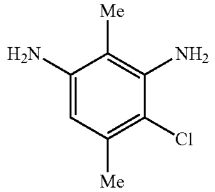
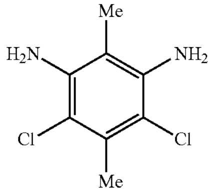
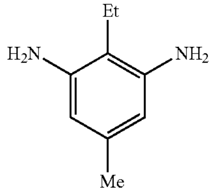
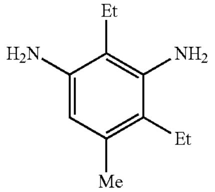
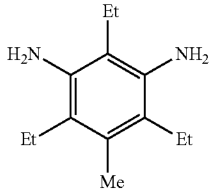
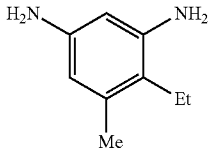
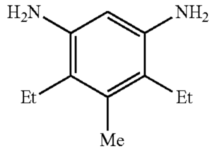
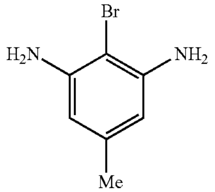
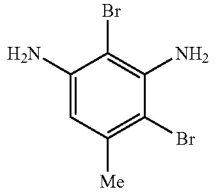
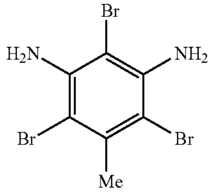
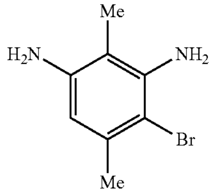
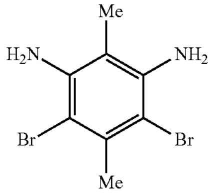

-continued
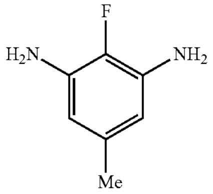
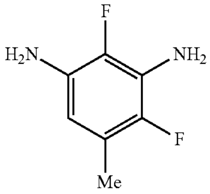
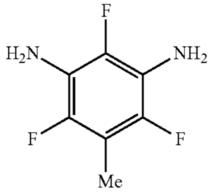
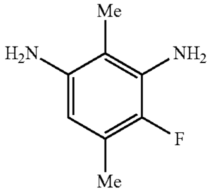
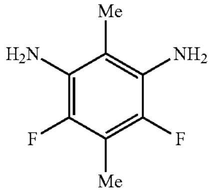
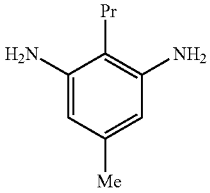
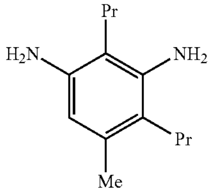
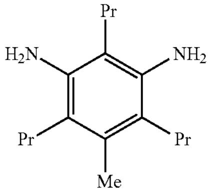
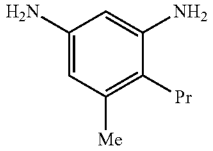
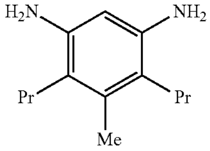
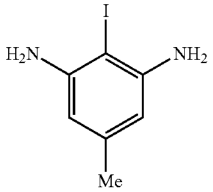
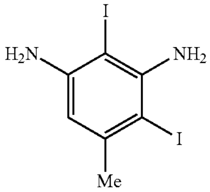
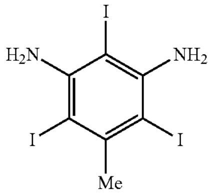
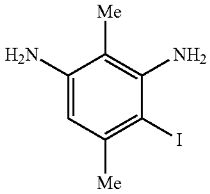
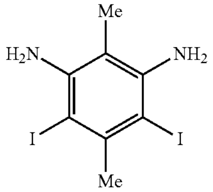
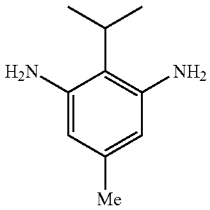
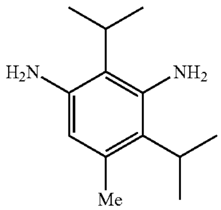
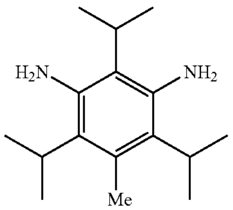
-continued
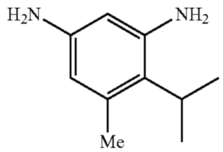
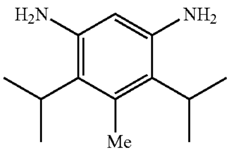
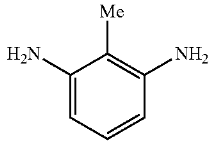
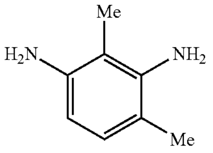
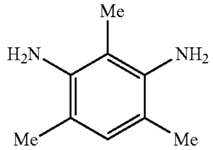
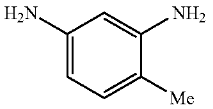
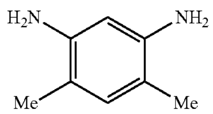
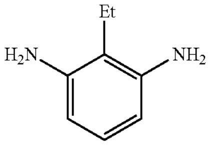
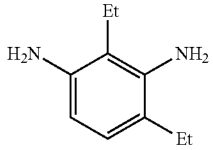
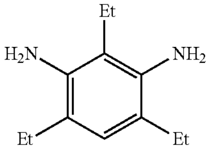
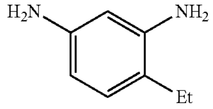
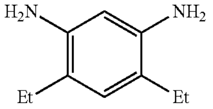
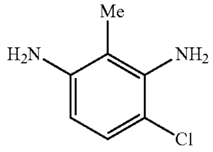
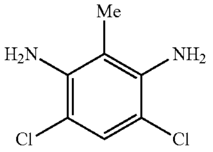
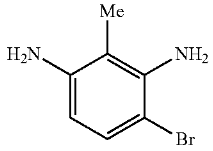
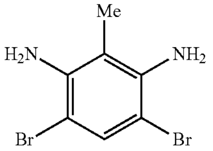
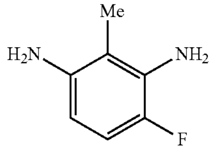
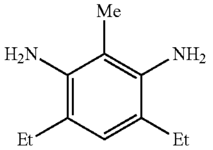
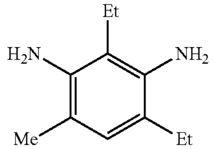
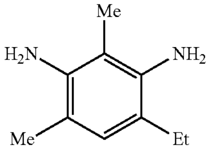
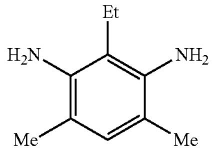
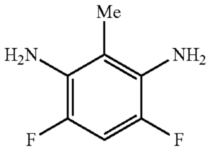

-continued
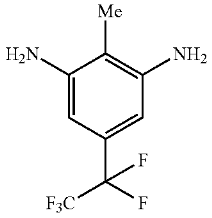
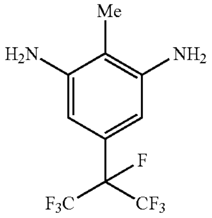
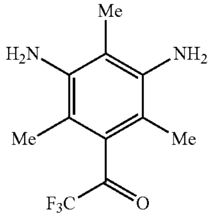
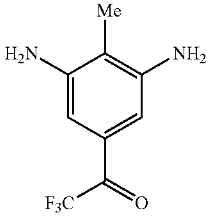
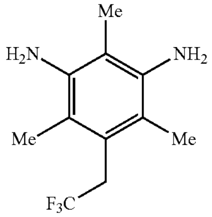
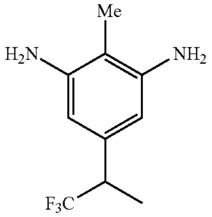
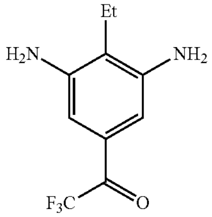
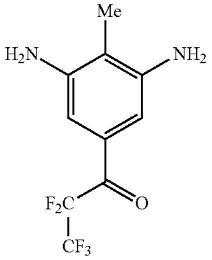
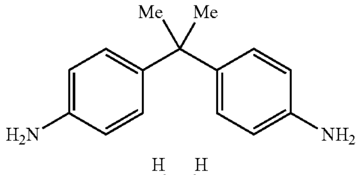
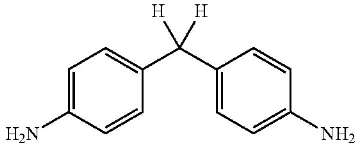
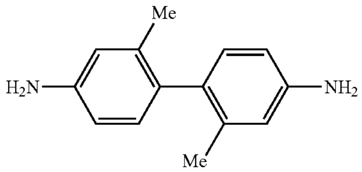
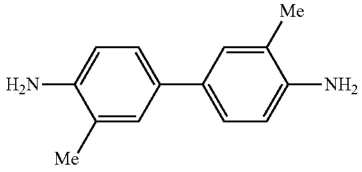
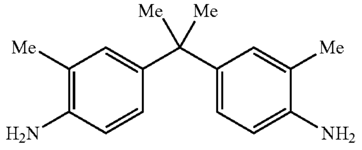
-continued
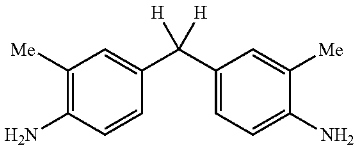
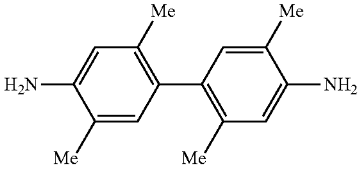
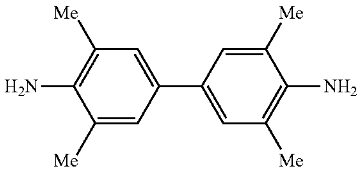
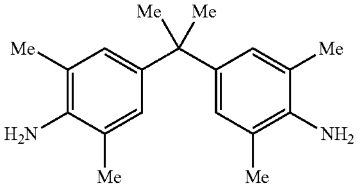
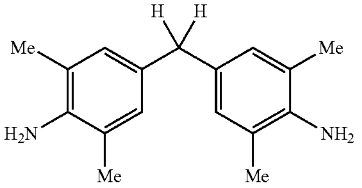
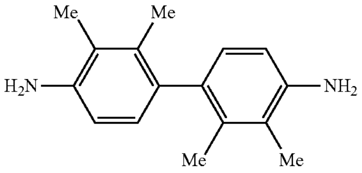
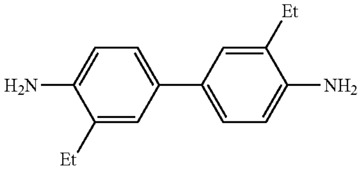
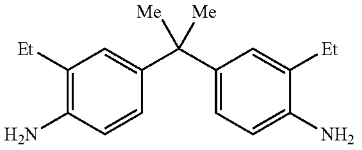
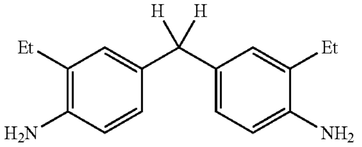
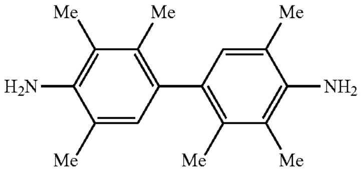

-continued

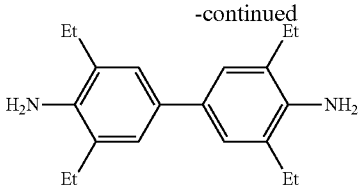

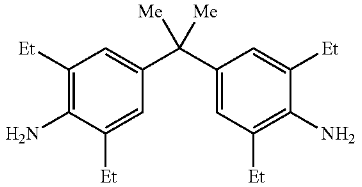

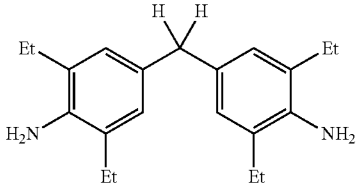

The polyimide compound according to the present invention may be any of a block copolymer, a random copolymer, and a graft copolymer.

The polyimide compound according to the present invention can be obtained by mixing the above-described raw materials in a solvent and causing condensation polymerization by a conventional method as described above.

Examples of the solvent include, but are not limited to, ester compounds such as methyl acetate, ethyl acetate, and butyl acetate; aliphatic ketone compounds such as acetone, methyl ethyl ketone, methyl isobutyl ketone, diacetone alcohol, cyclopentanone, and cyclohexanone; ether compounds such as ethylene glycol dimethyl ether, dibutyl ether, tetrahydrofuran, methylcyclopentyl ether, and dioxane; amide compounds such as N-methylpyrrolidone, 2-pyrrolidone, dimethylformamide, dimethylimidazolidinone, and dimethylacetamide; and sulfur-containing compounds such as dimethyl sulfoxide and sulfolane. These organic solvents are appropriately selected so as to dissolve the tetracarboxylic dianhydride and diamine compound as reaction substrates, polyamic acid as a reaction intermediate, and the polyimide compound as a final product. The organic solvent is preferably an ester compound (preferably butyl acetate), an aliphatic ketone compound (preferably methyl ethyl ketone, methyl isobutyl ketone, diacetone alcohol, cyclopentanone, or cyclohexanone), an ether compound (diethylene glycol monomethyl ether or methylcyclopentyl ether), an amide compound (preferably N-methylpyrrolidone), or a sulfur-containing compound (dimethyl sulfoxide or sulfolane). These may be used alone or in combination of two or more.

The polymerization reaction temperature is not particularly limited, and may be a temperature generally employed in the synthesis of polyimide compounds. Specifically, the polymerization reaction temperature is preferably −40° C. to 60° C., more preferably −30° C. to 50° C.

The polyamic acid produced by the polymerization reaction is imidized through intramolecular cyclodehydration to obtain a polyimide compound. For example, a thermal imidization method in which a reaction is performed under heating at 120° C. to 200° C. while water generated as a by-product is removed to the outside of the system or a so-called chemical imidization method in which a dehydration condensing agent such as acetic anhydride, dicyclohexylcarbodiimide, or triphenyl phosphite is used in the coexistence of a basic catalyst such as pyridine, triethylamine, or DBU is suitably used.

In the present invention, the total concentration of the tetracarboxylic dianhydride and the diamine compound in a polymerization reaction liquid of the polyimide compound is not particularly limited, and is preferably 5 to 70 mass %, more preferably 5 to 50 mass %, still more preferably 5 to 30 mass %.

In the present invention, the bromination reaction may be a reaction that regioselectively brominates a side-chain benzylic position.

The side-chain benzylic position is a term used in the field of general organic synthesis and refers to a position that is in an alkyl group that a ring-constituting carbon atom of an aromatic ring has as a substituent, the position being directly bonded to a carbon atom (side-chain benzylic carbon) directly bonded to the ring-constituting carbon atom. Thus, a side-chain benzylic hydrogen refers to a hydrogen atom directly bonded to a side-chain benzylic carbon.

In bromine substitution of side-chain benzylic hydrogens, it is not necessary that all side-chain benzylic hydrogens in repeating units constituting the polyimide compound be substituted with bromine. For example, some of the side-chain benzylic hydrogens may be substituted with bromine (i.e., when a plurality of benzylic hydrogens are present at one benzylic carbon, some or all of the benzylic hydrogens may be substituted with bromine), or benzylic hydrogens in some repeating units may be brominated.

The term "bromination ratio" as used herein refers to the ratio of the number of bromine atoms to the total number of hydrogen atoms and bromine atoms directly bonded to all benzylic carbons in the entire polyimide compound. The bromination ratio is calculated by the following formula.

Bromination ratio (%)=100×(number of bromine atoms directly bonded to all benzylic carbons in polyimide compound)/(total number of hydrogen atoms and bromine atoms directly bonded to all benzylic carbons in polyimide compound)

The number of bromine atoms or hydrogen atoms in the calculation of the bromination ratio can be determined by $^1$H-NMR analysis. For the analysis, reference can be made to, for example, the $^1$H-NMR analysis described in Example 1 of WO2000/56430A.

Any brominating agent that can brominate side-chain benzylic positions of an aromatic compound can be used, and examples thereof include N-bromosuccinimide (NBS), 1,3-dibromo-5,5'-dimethylhydantoin (DBMH), sulfuryl bromide ($SO_2Br_2$), dibromoisocyanuric acid, and bromide.

As a method for promoting the bromination reaction, it is preferable to employ radical reaction conditions. Specifically, the reaction can be performed at high temperature or under ultraviolet irradiation with a radical generator added.

Examples of solvents that can be used include halogenated solvents such as carbon tetrachloride, chloroform, methylene chloride, 1,2-dichloroethane, and 1,1,2,2-tetrachloroethane; and organic solvents such as N,N-dimethylformamide (DMF), N,N-dimethylacetamide (DMAc), and 1-methylpyrrolidinone (NMP).

The temperature of the bromination reaction can be, for example, 60° C. to 120° C., and the duration of the bromination reaction can be, for example, 0.5 to 24 hours. The reaction molar ratio of side-chain benzylic carbons to the brominating agent can be, for example, [side-chain benzylic carbons]:[brominating agent]=20:1 to 1:10. The degree of bromination can be controlled by adjusting the molar ratio.

Isolation and purification of the polyimide compound obtained by this bromination reaction can be performed by adding the reaction solution into a solvent such as methanol to precipitate the polyimide compound, washing the obtained polyimide compound with a solvent such as methanol, and performing drying at a temperature of 20° C. to 80° C.

The bromination ratio of the polyimide compound obtained by the bromination reaction is preferably 3% or more, more preferably 5% or more, even more preferably 8% or more, still more preferably 10% or more, particularly preferably 15% or more. The bromination ratio of the polyimide compound obtained by the bromination reaction is typically 98% or less and may be 95% or less, 90% or less, or 85% or less.

Next, the configuration of a gas separation membrane according to the present invention will be described. The gas separation membrane according to the present invention contains the polyimide compound according to the present invention as a constituent material of a gas separation layer. The gas separation layer is formed as a thin layer to secure gas permeability, and at the same time desired gas separation selectivity is achieved. One method of forming the gas separation layer as a thin layer is a method in which the gas separation membrane is formed as an asymmetric membrane by a phase separation process, with a portion that contributes to separation being formed as a thin layer called a dense layer or a skin layer. In this asymmetric membrane, the portion other than the dense layer functions as a support layer responsible for mechanical strength of the membrane.

A form of a composite membrane is also known in which a gas separation layer having a gas separation function and a support layer responsible for mechanical strength are made of different materials, and the gas separation layer having gas separation capability is formed as a thin layer on a gas-permeable support layer. Each form will be described below in sequence.

Gas Separation Asymmetric Membrane

A gas separation asymmetric membrane can be formed by a phase inversion process using a solution including a polyimide compound. The phase inversion process is a known process for forming a membrane while bringing a polymer solution into contact with a coagulation liquid to cause phase inversion. In the present invention, a so-called dry-wet process is suitably used. The dry-wet process includes evaporating a solution on a surface of a polymer solution shaped as a membrane to form a thin dense layer, and subsequently immersing the dense layer in a coagulating liquid (a solvent which is compatible with a solvent of the polymer solution and in which the polymer is insoluble) to form fine pores using a phase-separation phenomenon that occurs at this time, thereby forming a porous layer. This process was suggested by Loeb, Sourirajan, et al. (for example, U.S. Pat. No. 3,133,132A).

In the gas separation asymmetric membrane according to the present invention, the thickness of the surface layer that is referred to as a dense layer or a skin layer and contributes to gas separation is not particularly limited, and is preferably 0.01 to 5.0 μm, more preferably 0.05 to 1.0 from the viewpoint of imparting practical gas permeability. The porous layer located below the dense layer serves to reduce the resistance to gas permeability and also impart mechanical strength. The thickness of the porous layer is not particularly limited as long as the asymmetric membrane is provided with a self-supporting property. For example, the thickness can be 5 to 500 and is more preferably 5 to 200 still more preferably 5 to 100

The gas separation asymmetric membrane according to the present invention may be a flat membrane or a hollow fiber membrane. The asymmetric hollow fiber membrane can be produced by a dry-wet spinning process. The dry-wet spinning process is a process for producing an asymmetric hollow fiber membrane by applying a dry-wet process to a polyimide compound solution that has been ejected from a spinning nozzle to have a desired hollow fiber shape. More specifically, a polyimide compound solution is ejected from a nozzle to have a desired hollow fiber shape and is allowed to pass through the air or a nitrogen gas atmosphere immediately after the ejection, and the resulting polyimide compound solution is then immersed in a coagulating liquid which is compatible with a solvent of the polyimide compound solution and in which the polyimide compound is substantially insoluble to form an asymmetric structure. Subsequently, the asymmetric structure is dried and heat-treated, as needed, to produce a separation membrane.

The solution viscosity of the solution including the polyimide compound to be ejected from a nozzle is 2 to 17,000 Pas at an ejection temperature (e.g., 10° C.), preferably 10 to 1,500 Pas, particularly preferably 20 to 1,000 Pas, because the shape after ejection, such as a hollow fiber shape, can be stably obtained. The immersion in the coagulating liquid is preferably performed by immersing the ejected polymer solution in a primary coagulating liquid to be coagulated to such an extent that the shape of the membrane such as a hollow fiber shape can be maintained, then winding the resulting membrane around a guide roll, and subsequently immersing the membrane in a secondary coagulating liquid to sufficiently coagulate the whole membrane. The coagulated membrane is efficiently dried if the drying is performed after the coagulating liquid is replaced with a solvent such as a hydrocarbon. The heat treatment for the drying is preferably performed at a temperature lower than the softening point or secondary transition point of the polyimide compound used.

Gas Separation Composite Membrane

In the gas separation composite membrane, a gas separation layer containing a particular polyimide compound is formed on the upper side or the lower side of a gas-permeable support layer. This composite membrane is preferably formed by applying a coating liquid (dope) for forming the gas separation layer onto at least a top surface of a porous support (in this specification, "applying" includes adhesion on a surface by dipping).

Figure 2:
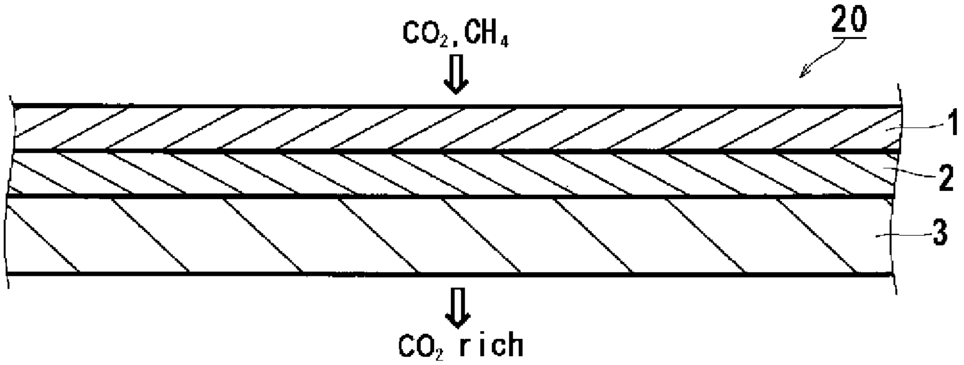
FIG. 2 is a sectional view schematically showing a gas separation composite membrane according to another embodiment of the present invention.
Figure 3:
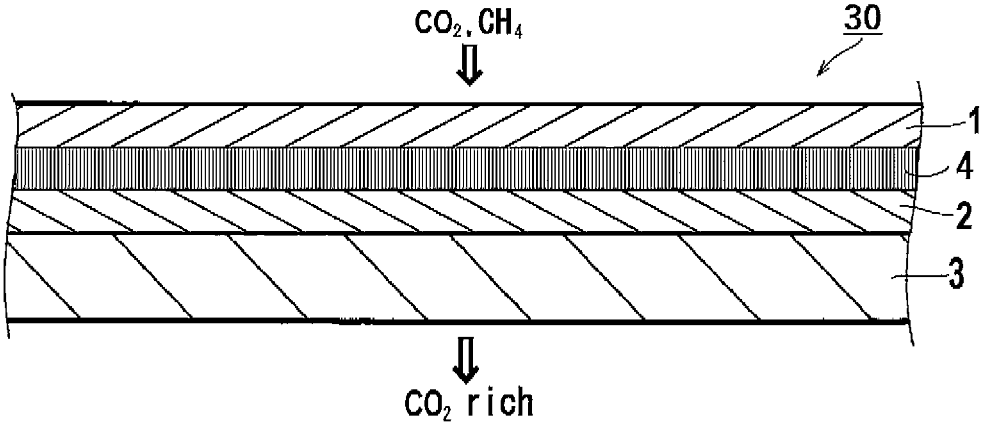
FIG. 3 is a sectional view schematically showing a gas separation composite membrane according to another embodiment of the present invention.
Figure 4:
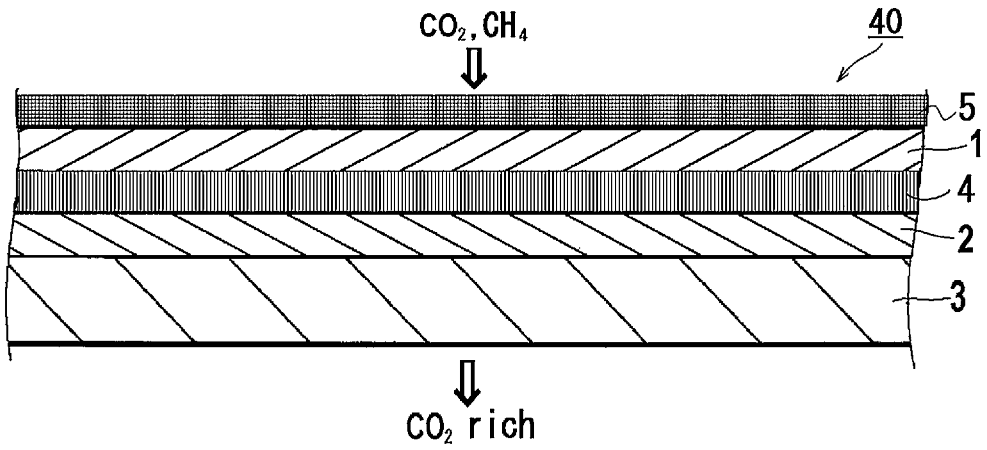
FIG. 4 is a sectional view schematically showing a gas separation composite membrane according to another embodiment of the present invention.

FIG. 1 is a longitudinal sectional view schematically illustrating a gas separation composite membrane 10 according to a preferred embodiment of the present invention. Reference numeral 1 denotes a gas separation layer, and reference numeral 2 denotes a support layer formed of a porous layer. FIG. 2 is a sectional view schematically illustrating a gas separation composite membrane 20 according to a preferred embodiment of the present invention. In this embodiment, a nonwoven fabric layer 3 is added as a support layer in addition to the gas separation layer 1 and the porous layer 2. FIG. 3 is a sectional view schematically illustrating a gas separation composite membrane 30 according to another preferred embodiment of the present invention. In this embodiment, a smoothing layer 4 is further provided between the gas separation layer 1 and the porous layer 2 in the gas separation composite membrane illustrated in FIG. 2. FIG. 4 is a sectional view schematically illustrating a gas separation composite membrane 40 according to still another preferred embodiment of the present invention. In this embodiment, a protective layer 5 is further provided on the gas separation layer 1 in addition to the gas separation layer 1, the smoothing layer 4, the porous layer 2, and the nonwoven fabric layer 3 in the gas separation composite membrane illustrated in FIG. 3.

FIGS. 1 to 4 illustrate how selective permeation of carbon dioxide in a mixed gas of carbon dioxide and methane proceeds.

In this specification, the "upper side of the support layer" means that another layer may be interposed between the support layer and the gas separation layer. For the expression of "upper and lower", the side to which a gas to be separated is supplied is the "upper side", and the side from which the separated gas is discharged (the side from which the permeating gas comes out) is the "lower side" unless otherwise specified.

The gas separation composite membrane according to the present invention preferably has the gas separation layer on the upper side of the gas-permeable support layer.

The gas separation composite membrane according to the present invention can be provided by forming a gas separation layer on at least a top surface of a porous support (support layer). The thickness of the gas separation layer is preferably as small as possible, with the proviso that high gas permeability is imparted while mechanical strength and separation selectivity are maintained.

In the gas separation composite membrane according to the present invention, the thickness of the gas separation layer is not particularly limited, and is preferably 0.01 to 5.0 μm, more preferably 0.05 to 2.0 μm.

The porous support that is preferably applied to the support layer is not particularly limited as long as the porous support serves to impart mechanical strength and high gas permeability, and may be made of an organic or inorganic material. The porous support is preferably an organic high-molecular-weight porous membrane. The thickness of the porous support is preferably 1 to 3,000 μm, more preferably 5 to 500 μm, still more preferably 5 to 150 μm. For the pore structure of this porous membrane, the average pore diameter is typically 10 μm or less, preferably 0.5 μm or less, more preferably 0.2 μm or less. The porosity of the porous support is preferably 20% to 90%, more preferably 30% to 80%.

Here, if the support layer has "gas permeability", it means that when carbon dioxide is supplied to the support layer (a membrane constituted by the support layer alone) at 40° C. with the total pressure on the gas supply side being set to 4 MPa, the permeation rate of the carbon dioxide is $1\times10^{-5}$ $cm^3$ (STP)/$cm^2$·sec·cmHg (10 GPU) or more. Furthermore, for the gas permeability of the support layer, when carbon dioxide is supplied at 40° C. with the total pressure on the gas supply side being set to 4 MPa, the permeation rate of the carbon dioxide is preferably $3\times10^{-5}$ $cm^3$ (STP)/$cm^2$·sec·cmHg (30 GPU) or more, more preferably 100 GPU or more, still more preferably 200 GPU or more. Examples of the material for the porous membrane include conventionally known polymers including polyolefin resins such as polyethylene and polypropylene, fluorine-containing resins such as polytetrafluoroethylene, polyvinyl fluoride, and polyvinylidene fluoride, and various resins such as polystyrene, cellulose acetate, polyurethane, polyacrylonitrile, polyphenylene oxide, polysulfone, polyethersulfone, polyimide, and polyaramide. The porous membrane may have any shape such as a flat shape, a spiral shape, a tubular shape, or a hollow fiber shape.

In the gas separation composite membrane according to the present invention, a support for imparting mechanical strength is preferably further formed on the lower side of the support layer on which the gas separation layer is formed. Examples of such supports include woven fabrics, nonwoven fabrics, and nets, and a nonwoven fabric is suitably used in terms of membrane formability and cost. As the nonwoven fabric, fibers formed of polyester, polypropylene, polyacrylonitrile, polyethylene, polyamide, and the like may be used alone or in combination of two or more. The nonwoven fabric can be produced, for example, by papermaking main fibers and binder fibers that are homogeneously dispersed in water with a cylinder machine, a Fourdrinier machine, or the like and drying the resulting product with a dryer. Furthermore, it is also preferable to hot-press the nonwoven fabric by nipping it with two rolls for the purpose of, for example, removing fuzz or improving mechanical properties.

The method for producing the gas separation composite membrane is known per se and can be found in, for example, JP2015-83296A.

In the gas separation membrane according to the present invention, the content of the polyimide compound according to the present invention in the gas separation layer is not particularly limited as long as desired gas separation performance is achieved. From the viewpoint of further improving the gas separation performance, the content of the polyimide compound according to the present invention in the gas separation layer is preferably 20 mass % or more, more preferably 40 mass % or more, still more preferably 60 mass % or more, particularly preferably 70 mass % or more. The content of the polyimide compound according to the present invention in the gas separation layer may be 100 mass %, but is typically 99 mass % or less.

Another Layer Between Support Layer and Gas Separation Layer

In the gas separation composite membrane according to the present invention, another layer may be present between the support layer and the gas separation layer. The other layer is preferably a so-called smoothing layer, and one preferred example of the smoothing layer is a siloxane compound layer. By disposing the siloxane compound layer, irregularities on the uppermost surface of the support can be smoothed, which makes it easy to form a thin separation layer. Examples of the siloxane compound for forming the siloxane compound layer include compounds whose main chain is constituted by polysiloxane and compounds having a siloxane structure and a non-siloxane structure in their main chains. As the siloxane compound layer, for example, those described in paragraphs [0103] to [0127] in JP2015-160167A can be suitably used.

Protective Layer on Upper Side of Gas Separation Layer

The gas separation membrane may have, as a protective layer, a siloxane compound layer on the gas separation layer.

As the siloxane compound layer used as the protective layer, for example, those described in paragraphs [0125] to [0175] in WO2017/002407A can be suitably used.

The gas separation membrane according to the present invention is preferably in the form of a gas separation composite membrane.

Applications of Gas Separation Membrane

The gas separation membrane (composite membrane and asymmetric membrane) according to the present invention can be suitably used for gas separation recovery and gas separation purification. For example, the gas separation membrane according to the present invention can be a gas separation membrane that can efficiently separate a particular gas in a gas mixture containing gases, for example, hydrogen, helium, carbon monoxide, carbon dioxide, hydrogen sulfide, oxygen, nitrogen, ammonia, sulfur oxides, nitrogen oxides, hydrocarbons such as methane and ethane, unsaturated hydrocarbons such as propylene, and perfluoro compounds such as tetrafluoroethane. In particular, the gas separation membrane according to the present invention is preferably a gas separation membrane that selectively separates carbon dioxide in a gas mixture containing carbon dioxide/hydrocarbon (methane).

The pressure during gas separation using the gas separation membrane according to the present invention is preferably 0.5 to 10 MPa, more preferably 1 to 10 MPa, still more preferably 2 to 7 MPa. The gas separation temperature is preferably −30° C. to 90° C., more preferably 15° C. to 70° C.

Gas Separation Module and Gas Separation Apparatus

A gas separation module can be produced using the gas separation membrane according to the present invention. The module is, for example, a spiral module, a hollow fiber module, a pleated module, a tubular module, or a plate and frame module.

Furthermore, a gas separation apparatus configured to separate and recover a gas or separate and purify a gas can be obtained using the gas separation membrane or the gas separation module according to the present invention.

EXAMPLES

The present invention will now be described in more detail with reference to Examples, but the present invention is not limited to these Examples. In the following, Me represents unsubstituted methyl.

Preparation of Polyimide Compound P-01

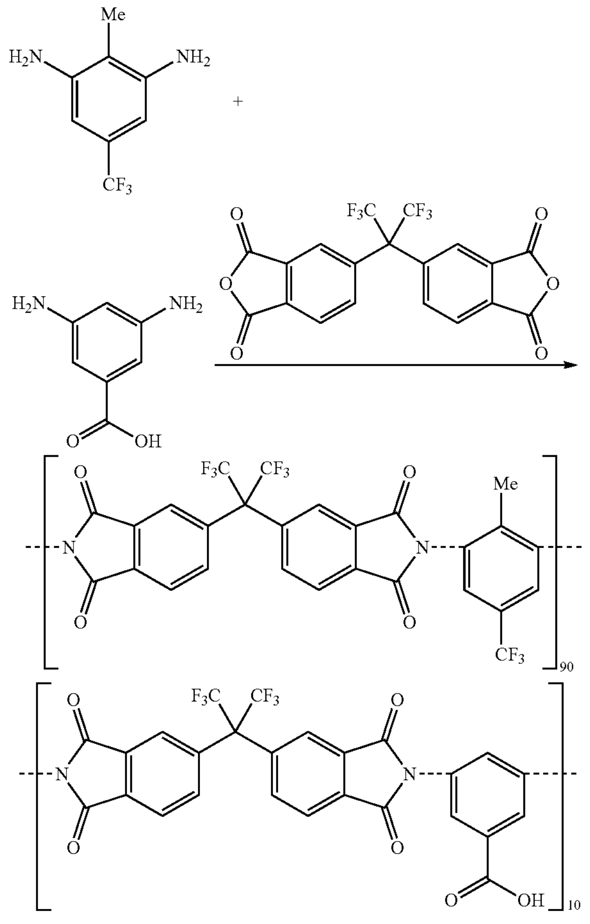

A polyimide compound P-01 was prepared as described below according to the above scheme.

In a three-necked flask, 13.7 g of 2-methyl-5-(trifluoromethyl)benzene-1,3-diamine (synthesized by a conventional method), 1.2 g of 3,5-diaminobenzoic acid (manufactured by Nipponjunryo Chemicals Co., Ltd.), and 98 mL of N-methylpyrrolidone (manufactured by FUJIFILM Wako Pure Chemical Corporation) were placed, and the flask was purged with nitrogen gas. Under water cooling, 35.5 g of 4,4'-(hexafluoroisopropylidene)diphthalic anhydride (manufactured by DAIKIN Industries, Ltd.) was added, and washing was performed with 35 mL of N-methylpyrrolidone. After stirring at 40° C. for 3 hours, 32 mL of toluene (manufactured by FUJIFILM Wako Pure Chemical Corporation) was added, and stirring was performed at 170° C. for 6 hours. After cooling to room temperature, the resulting product was diluted with 30 mL of N-methylpyrrolidone and 350 mL of acetone and transferred to a 5 L three-necked flask. To the three-necked flask, 2 L of methanol was added dropwise to precipitate a polyimide compound in the form of white powder. Suction filtration, reslurry washing with methanol, and air blow drying at 50° C. for 20 hours were performed to obtain 40.3 g (yield: 85%) of a polyimide (precursor for bromination reaction). The weight-average molecular weight determined by gel permeation chromatography using tetrahydrofuran was 92,000.

In a three-necked flask, 9.0 g of the polyimide and 225 g of 1,2-dichloroethane (manufactured by FUJIFILM Wako Pure Chemical Corporation) were placed. Into the flask, 15.5 g of n-bromosuccinimide (manufactured by FUJIFILM Wako Pure Chemical Corporation) and 0.16 g of 2,2'-azobis (isobutyronitrile) (manufactured by FUJIFILM Wako Pure Chemical Corporation) were added, and stirring was performed at 85° C. for 8 hours, after which the resulting solution was cooled to room temperature. To the reaction solution, methanol was added dropwise to precipitate a polyimide compound in the form of powder, and suction filtration was performed. After reprecipitation and reslurry washing with methanol were repeated, air blow drying was performed at 50° C. for 18 hours to obtain 10.0 g of a target polyimide compound P-01. The weight-average molecular weight determined by gel permeation chromatography using tetrahydrofuran was 100,000. Based on $^1$H-NMR analysis, the bromination ratio was calculated to be 60%.

P-01 (weight-average molecular weight: 100,000, bromination ratio: 60%)

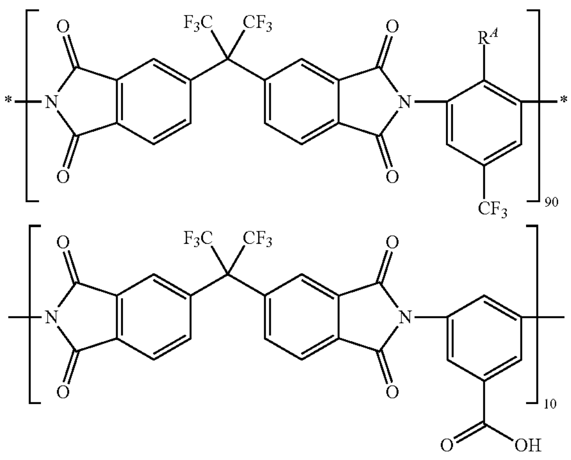

In the polyimide compound P-01, $R^A$ represents $CH_3$, $CH_2Br$, $CHBr_2$, or $CBr_3$.

The numbers ("90" and "10") attached to the lower right of repeating units indicate molar ratios of the repeating units. This also applies to the expression of the following repeating units.

Preparation of Polyimide Compounds P-02 to P-13 and cP-01 to cP-08

Polyimide compounds P-02 to P-12 and cP-01 to cP-06 having the following structures were obtained in the same manner as in Preparation of polyimide compound P-01, except that the raw materials used were changed to those leading to the following structures.

P-02 (weight-average molecular weight: 90,000, bromination ratio: 20%)

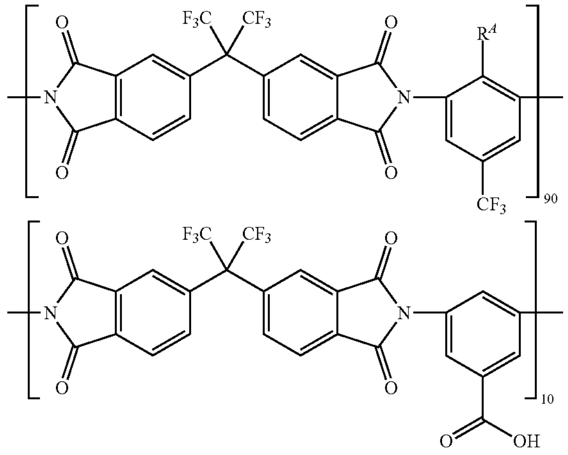

P-03 (weight-average molecular weight: 140,000, bromination ratio: 30%)

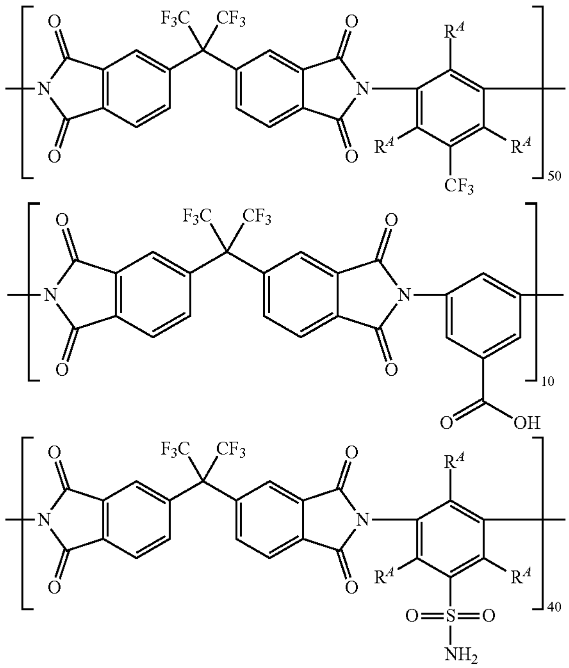

P-04 (weight-average molecular weight: 100,000, bromination ratio: 70%)

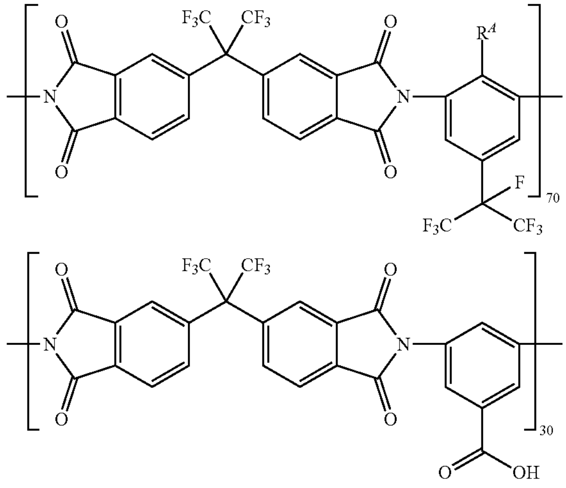

P-05 (weight-average molecular weight: 110,000, bromination ratio: 30%)

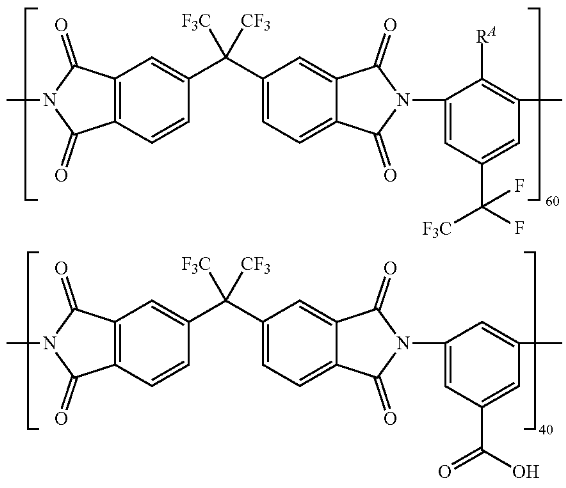

P-06 (weight-average molecular weight: 130,000, bromination ratio: 80%)

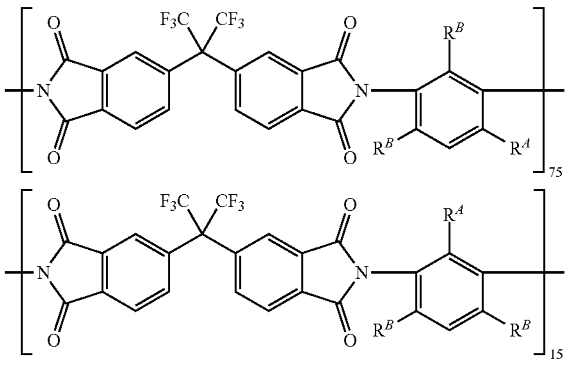

-continued
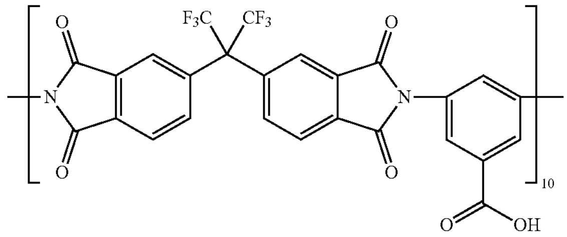
P-07 (weight-average molecular weight: 120,000, bromination ratio: 20%)
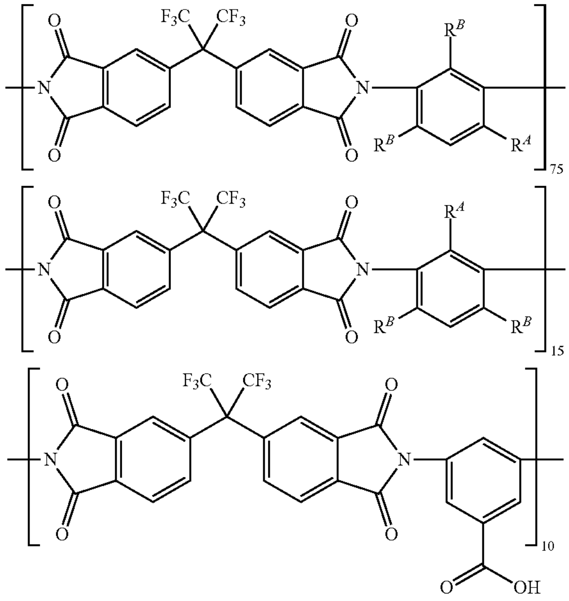
P-08 (weight-average molecular weight: 50,000, bromination ratio: 60%)
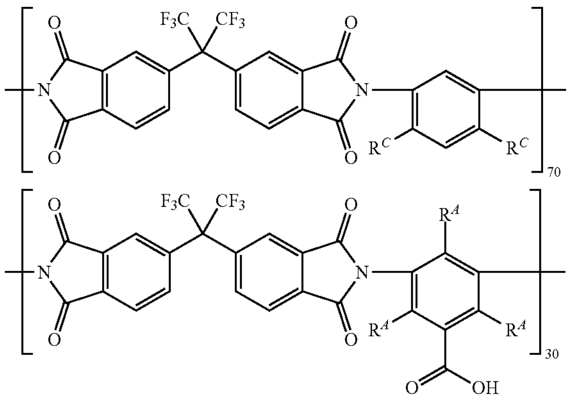
P-09 (weight-average molecular weight: 60,000, bromination ratio: 15%)
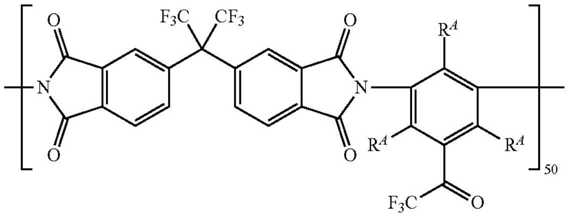
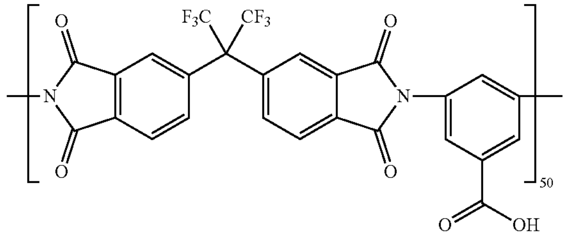
P-10 (weight-average molecular weight: 180,000, bromination ratio: 35%)
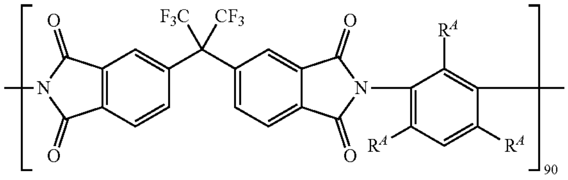
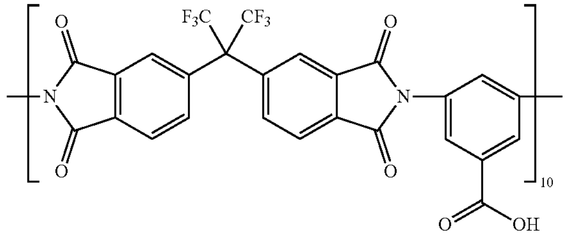
P-11 (weight-average molecular weight: 100,000, bromination ratio: 40%)
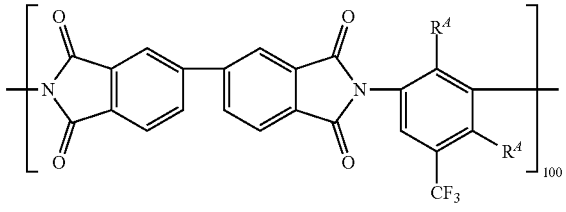
P-12 (weight-average molecular weight: 140,000, bromination ratio: 20%)

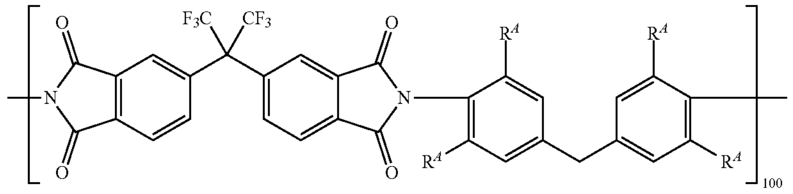
P-13 (weight-average molecular weight: 170,000, bromination ratio: 10%)
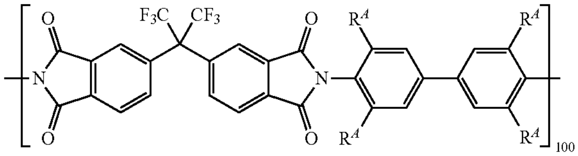
cP-01 (bromination ratio: 27.6%)
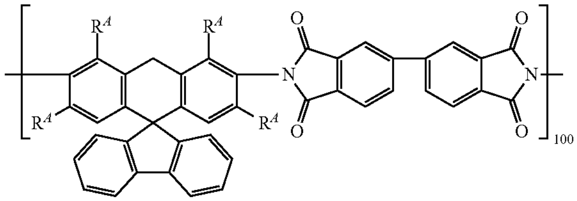
cP-02 (bromination ratio: 59%)
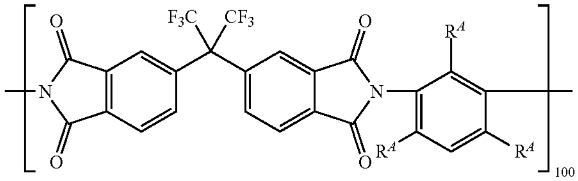
cP-03
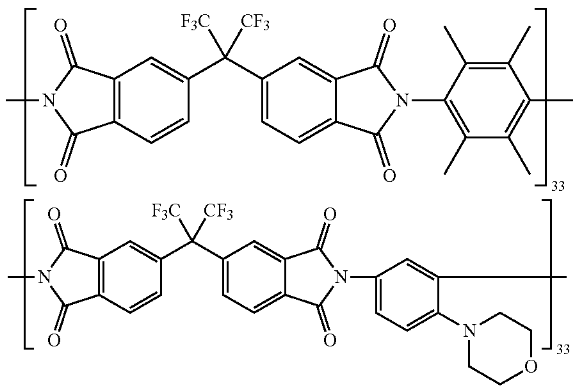
-continued
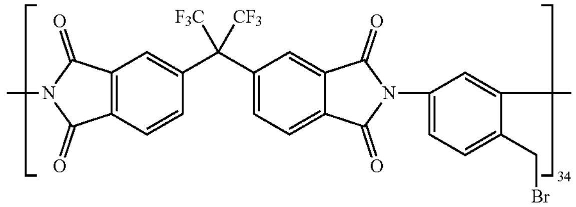
cP-04
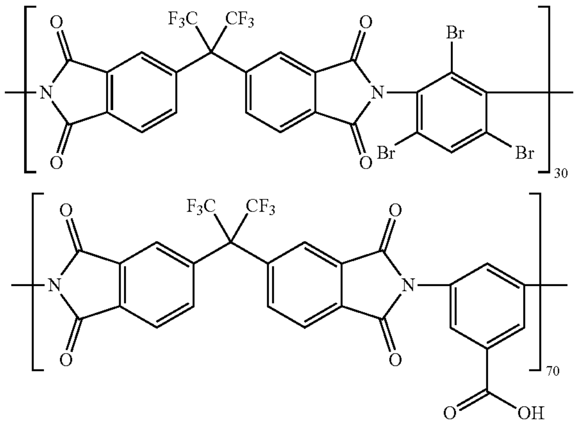
cP-05 (bromination ratio: 20%)
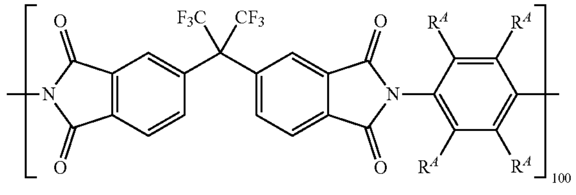
cP-06
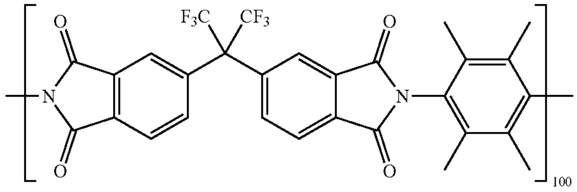

cP-07

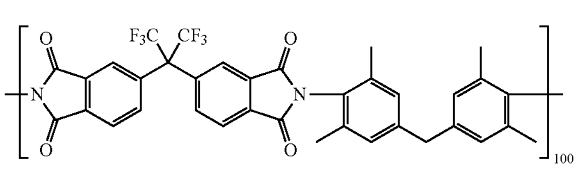

cP-08

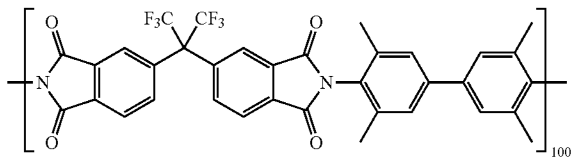

In the polyimide compounds P-02 to cP-05, $R^A$ represents $CH_3$, $CH_2Br$, $CHBr_2$, or $CBr_3$.

In the polyimide compounds P-06 and P-07, $R^B$ represents $CH_2CH_3$, $CHBrCH_3$, or $CBr_2CH_3$.

In the polyimide compound P-08, $R^C$ represents $CH(CH_3)_2$ or $CBr(CH_3)_2$.

In the preparation of the polyimide compound P-06, ETHACURE100 (manufactured by Albemarle Corporation, USA), a mixture of 3,5-diethyltoluene-2,4-diamine and 3,5-diethyltoluene-2,6-diamine, was used as a raw material.

In the preparation of the polyimide compound cP-03, 4-bromo-1,3-benzenediamine (a pre-brominated diamine compound) was used as one of the starting diamine compounds. Thus, no bromination reaction was performed in the preparation of the polyimide compound cP-03.

The polyimide compounds cP-07 and cP-08 are compounds before bromination of the polyimide compounds P-12 and P-13, respectively.

Example 1: Production of Gas Separation Membrane

Production of PAN Porous Membrane with Smoothing Layer

Preparation of Radiation-Curable Polymer Having Dialkylsiloxane Group

In a 150 mL three-necked flask, 39 g of UV9300 (manufactured by Momentive), 10 g of X-22-162C (manufactured by Shin-Etsu Chemical Co., Ltd.), and 0.007 g of DBU (1,8-diazabicyclo[5.4.0]undec-7-ene) were placed and dissolved in 50 g of n-heptane. This was maintained at 95° C. for 168 hours to obtain a radiation-curable polymer solution having a poly(siloxane) group (viscosity at 25° C.: 22.8 mPa·s).

Preparation of Polymerizable Radiation-Curable Composition

The radiation-curable polymer solution in an amount of 5 g was cooled to 20° C. and diluted with 95 g of n-heptane. To the resulting solution, 0.5 g of 4-isopropyl-4'-methyldiphenyliodonium tetrakis(pentafluorophenyl) borate (manufactured by Tokyo Chemical Industry Co., Ltd.) serving as a photopolymerization initiator and 0.1 g of ORGATIX TA-10 (manufactured by Matsumoto Fine Chemical Co., Ltd.) were added to prepare a polymerizable radiation-curable composition.

Application of Polymerizable Radiation-Curable Composition to Porous Support and Formation of Smoothing Layer The polymerizable radiation-curable composition was spin-coated on a polyacrylonitrile (PAN) porous membrane (the polyacrylonitrile porous membrane was present on a nonwoven fabric, and the thickness, inclusive of that of the nonwoven fabric, was about 180 μm) as a support, and then subjected to UV treatment (manufactured by Fusion UV System, Light Hammer 10, D-bulb) at a UV intensity of 24 kW/m for a treatment time of 10 seconds, followed by drying. In this manner, a smoothing layer having a dialkylsiloxane group and a thickness of 1 μm was formed on the porous support.

Production of Gas Separation Membrane

A gas separation composite membrane illustrated in FIG. 3 was produced.

In a 30 ml brown vial, 0.08 g of the polyimide compound P-01 and 7.92 g of tetrahydrofuran were mixed with each other and stirred for 30 minutes. Subsequently, the resulting mixture was spin-coated on the PAN porous membrane provided with the smoothing layer to form a gas separation layer, thereby obtaining a composite membrane. The thickness of the polyimide compound P-01 layer was about 100 nm, and the thickness of the PAN porous membrane, inclusive of that of the nonwoven fabric, was about 180 μm.

The polyacrylonitrile porous membrane used was a membrane having a molecular weight cutoff of 100,000 or less. The carbon dioxide permeability at 40° C. and 5 MPa of the porous membrane was 25,000 GPU.

Examples 2 to 13: Production of Gas Separation Membrane

Gas separation membranes of Examples 2 to 13 were produced in the same manner as in Example 1, except that the polyimide compound P-01 was replaced with the polyimide compounds P-02 to P-13 in the production of the composite membrane in Example 1.

Comparative Examples 1 to 8: Production of Gas Separation Membrane

Gas separation membranes of Comparative Examples 1 to 8 were produced in the same manner as in Example 1, except that the polyimide compound P-01 was replaced with the polyimide compounds cP-01 to cP-08.

Test Example 1: Evaluation of $CO_2$ Permeation Rate and Gas Separation Selectivity of Gas Separation Membrane-1

Using the gas separation membranes (composite membranes) of Examples and Comparative Examples, the gas separation performance was evaluated as follows.

Each gas separation membrane was cut together with the porous support (support layer) to a diameter of 47 mm to prepare a permeation test sample. Using a gas permeation analysis system manufactured by GTR TEC Corporation, a mixed gas of carbon dioxide ($CO_2$):methane ($CH_4$)=15:85 (volume ratio) was supplied with the total pressure on the gas supply side adjusted to 5 MPa (partial pressure of $CO_2$: 0.3 MPa), the flow rate adjusted to 500 mL/min, and the temperature adjusted to 35° C. The permeated gas was analyzed by gas chromatography. The gas permeability of the membrane was determined by calculating the $CO_2$ permeation rate as a gas permeance. The gas permeance (gas permeation rate) was expressed in units of GPU [1 GPU=$1\times10^{-6}$ $cm^3$ (STP)/$cm^2$·sec·cmHg]. The gas separation selectivity was calculated as a ratio ($R_{CO2}/R_{CH4}$) of $CO_2$ permeation rate $R_{CO2}$ to $CH_4$ permeation rate $R_{CH4}$ of the membrane.

The $CO_2$ permeation rate and the gas separation selectivity were applied to the following criteria to evaluate the performance of the gas separation membrane.

Evaluation Criteria of $CO_2$ Permeation Rate

A: 120 GPU or more
B: 105 GPU or more and less than 120 GPU
C: 90 GPU or more and less than 105 GPU
D: 75 GPU or more and less than 90 GPU
E: less than 75 GPU Evaluation Criteria of Gas Separation Selectivity ($R_{CO2}/R_{CH4}$)

A: 18 or more
B: 14 or more and less than 18
C: 10 or more and less than 14
D: less than 10

Test Example 2: Continuous Test

As in Test Example 1, the $CO_2$ permeation rate was determined after the mixed gas was continuously supplied for 3 days and 14 days. The evaluation criteria of the $CO_2$ permeation rate are the same as those in Test Example 1. From this test, the applicability to, for example, a natural gas field where the amount of impurity component (plasticizing component) is small can be evaluated in a simulated manner.

The results of Test Examples are shown in Table 1 below.

TABLE 1

| | | Test Example 1 | | Test Example 2 | |
|---|---|---|---|---|---|
| | Polyimide compound | $CO_2$ permeation rate | $RCO_2/RCH_4$ | $CO_2$ permeation rate (after gas supply for 3 days) | $CO_2$ permeation rate (after gas supply for 14 days) |
| Example 1 | P-01 | A | A | A | A |
| Example 2 | P-02 | A | A | A | A |
| Example 3 | P-03 | A | A | A | A |
| Example 4 | P-04 | A | A | A | A |
| Example 5 | P-05 | A | A | A | A |
| Example 6 | P-06 | A | B | A | A |
| Example 7 | P-07 | A | B | A | A |
| Example 8 | P-08 | A | B | A | A |
| Example 9 | P-09 | B | A | B | B |
| Example 10 | P-10 | B | B | B | B |
| Example 11 | P-11 | B | B | B | B |
| Example 12 | P-12 | C | B | C | C |
| Example 13 | P-13 | C | B | C | C |
| Comparative Example 1 | cP-01 | E | C | E | E |
| Comparative Example 2 | cP-02 | D | C | D | E |
| Comparative Example 3 | cP-03 | C | C | D | E |
| Comparative Example 4 | cP-04 | D | C | E | E |
| Comparative Example 5 | cP-05 | C | B | D | E |
| Comparative Example 6 | cP-06 | C | B | D | E |
| Comparative Example 7 | cP-07 | C | B | D | E |
| Comparative Example 8 | cP-08 | C | B | D | E |

As shown in Table 1, when the polyimide compound constituting the gas separation layer did not have the repeating unit represented by formula (I), the gas separation membrane tended to be poor in both initial gas permeability and gas separation selectivity (Comparative Examples 1 to 4), and even when the initial gas permeability and the gas separation selectivity were good to some extent, the gas permeability significantly decreased with time in the separation treatment of a mixed gas containing no plasticizing component (a mixed gas of carbon dioxide and methane alone) (Comparative Examples 5 to 8).

By contrast, the gas separation membrane including a gas separation layer containing the polyimide compound according to the present invention was excellent in both initial gas permeability and gas separation selectivity. Furthermore, in the separation treatment of a mixed gas containing no plasticizing component, the gas permeability was less likely to decrease with time (Examples 1 to 13).

While the present invention has been described in connection with embodiments thereof, we do not intend to limit our invention in any detail of the description unless otherwise specified. Rather, the invention should be broadly construed without departing from the spirit and scope of the invention as defined by the appended claims.

REFERENCE SIGNS LIST

1 gas separation layer
2 porous layer
3 nonwoven fabric layer
4 smoothing layer
5 protective layer
10, 20, 30, 40 gas separation composite membrane

What is claimed is:

1. A gas separation membrane comprising a gas separation layer containing a polyimide compound, wherein the polyimide compound includes a repeating unit represented by formula (I):

(I)
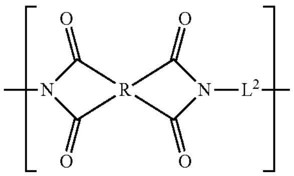
in formula (I), R represents a group represented by any one of formulae (I-1) to (I-28), where in formulae (I-1) to (I-28), $X^1$ to $X^3$ each represent a single bond or a divalent linking group, L represents —CH═CH— or —$CH_2$—, and $R^1$ and $R^2$ each represent a hydrogen atom or a substituent, and * represents a bonding site,
(I-1)
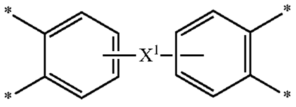
(I-2)
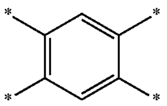
(I-3)
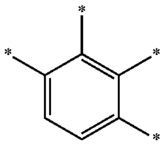
(I-4)
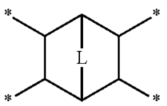
(I-5)
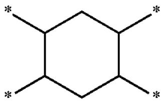
(I-6)
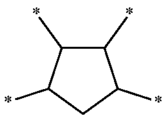
(I-7)
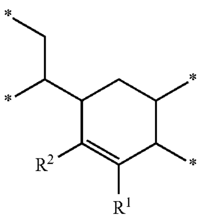
(I-8)
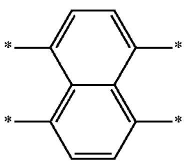
-continued
(I-9)
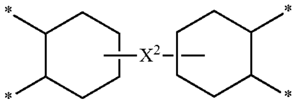
(I-10)
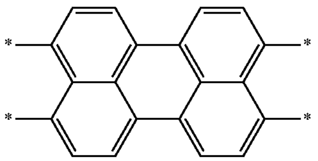
(I-11)
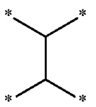
(I-12)
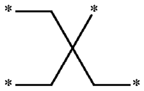
(I-13)
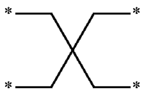
(I-14)
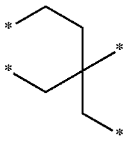
(I-15)
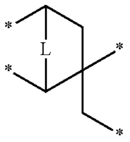
(I-16)
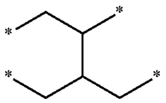
(I-17)
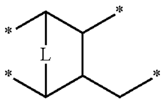
(I-18)
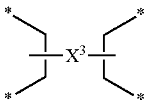
(I-19)
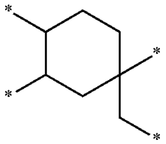
(I-20)
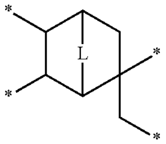

-continued (I-21)

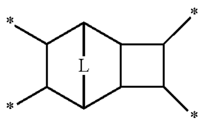

(I-22)

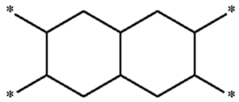

(I-23)

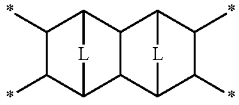

(I-24)

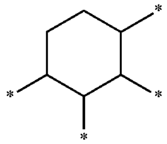

(I-25)

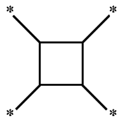

(I-26)

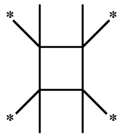

(I-27)

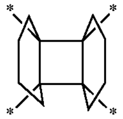

(I-28)

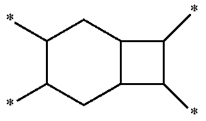

in formula (I), $L^2$ represents a group represented by any one of formulae (II-1) to (II-3):

(II-1)

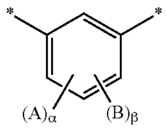

(II-2)

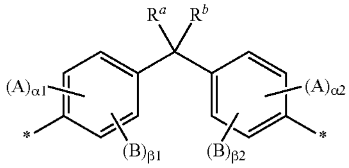

-continued (II-3)

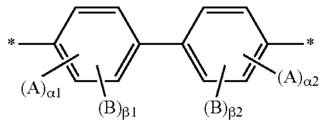

in formulae (II-1) to (II-3), A represents a group represented by any one of formulae (III-1) to (III-8), B represents unsubstituted methyl, unsubstituted ethyl, unsubstituted n-propyl, unsubstituted i-propyl, a fluorine-substituted alkyl group having 1 to 5 carbon atoms, a fluorine-substituted acyl group having 2 to 6 carbon atoms, or a halogen atom, and * represents a bonding site, wherein at least one A is the group represented by formula (III-4), the group represented by formula (III-5), the group represented by formula (III-6), the group represented by formula (III-7) or the group represented by formula (III-8), (III-1)

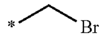

(III-2)

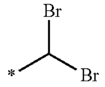

(III-3)

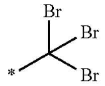

(III-4)

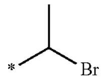

(III-5)

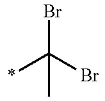

(III-6)

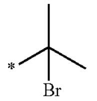

(III-7)

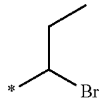

(III-8)

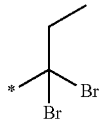

$\alpha$ and $\beta$ in formula (II-1) are integers satisfying (a), and $\alpha 1$, $\beta 1$, $\alpha 2$, and $\beta 2$ in formulae (II-2) and (II-3) are integers satisfying (b), $$1 \le \alpha \le 4, 0 \le \beta \le 3, 2 \le \alpha + \beta \le 4 \quad (a)$$

$$1 \le \alpha 1 + \alpha 2 \le 8, 0 \le 1 + \beta 2 \le 7, 2 \le \alpha 1 + \alpha 2 + \beta 1 + \beta 2 \le 8 \quad (b)$$

$R^a$ and $R^b$ in formula (II-2) each represent a hydrogen atom, unsubstituted methyl, unsubstituted ethyl, unsubstituted n-propyl, unsubstituted i-propyl, or a fluorine-substituted alkyl group having 1 to 5 carbon atoms, and in formulae (III-1) to (III-8), * represents a bonding site.

2. The gas separation membrane according to claim 1, wherein the groups represented by formulae (II-1) to (II-3) each have a fluorine-substituted alkyl group having 1 to 5 carbon atoms.

3. The gas separation membrane according to claim 1, wherein the groups represented by formulae (II-1) to (II-3) each have at least one of unsubstituted ethyl, the group represented by formula (III-4), or the group represented by formula (III-5).

4. The gas separation membrane according to claim 1, wherein the gas separation membrane is a gas separation composite membrane having the gas separation layer on an upper side of a gas-permeable support layer.

5. The gas separation membrane according to claim 1, wherein the gas separation membrane is used for selective permeation of carbon dioxide in a gas including carbon dioxide and methane.

6. A gas separation module comprising the gas separation membrane according to claim 1.

7. A gas separation apparatus comprising the gas separation membrane according to claim 1.

8. A polyimide compound comprising a repeating unit represented by formula (I):

(I)

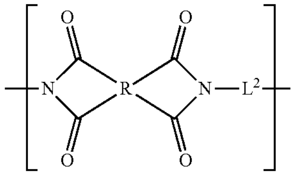

in formula (I), R represents a group represented by any one of formulae (I-1) to (I-28), where in formulae (I-1) to (I-28), $X^1$ to $X^3$ each represent a single bond or a divalent linking group, L represents —CH═CH— or —$CH_2$—, $R^1$ and $R^2$ each represent a hydrogen atom or a substituent, and * represents a bonding site, (I-1)

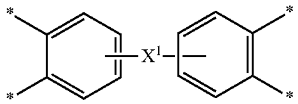

(I-2)

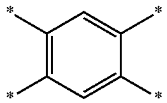

(I-3)

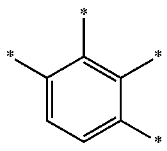

(I-4)

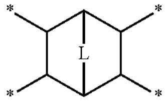

(I-5)

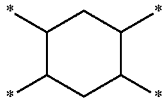

-continued (I-6)

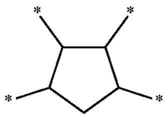

(I-7)

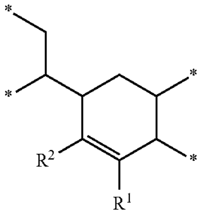

(I-8)

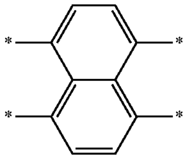

(I-9)

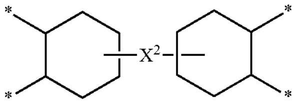

(I-10)

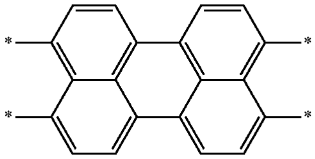

(I-11)

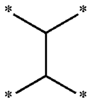

(I-12)

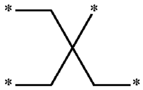

(I-13)

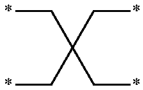

(I-14)

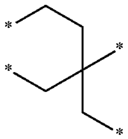

(I-15)

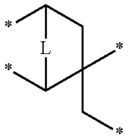

(I-16)

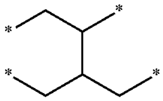

-continued (I-17)

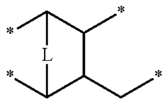

(I-18)

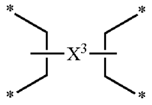

(I-19)

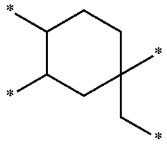

(I-20)

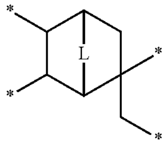

(I-21)

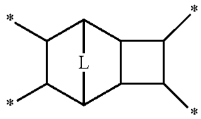

(I-22)

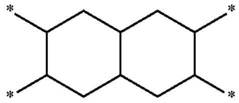

(I-23)

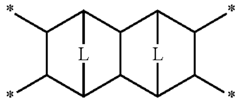

(I-24)

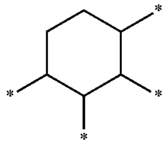

(I-25)

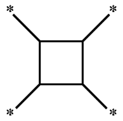

(I-26)

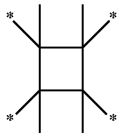

(I-27)

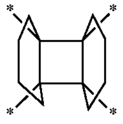

-continued (I-28)

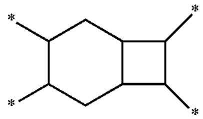

in formula (I), $L^2$ represents a group represented by any one of formulae (II-1) to (II-3):

(II-1)

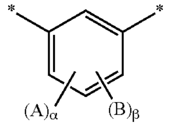

(II-2)

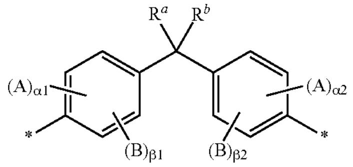

(II-3)

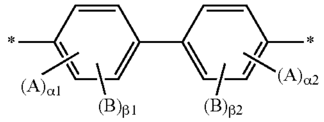

in formulae (II-1) to (II-3), A represents a group represented by any one of formulae (III-1) to (III-8), B represents unsubstituted methyl, unsubstituted ethyl, unsubstituted n-propyl, unsubstituted i-propyl, a fluorine-substituted alkyl group having 1 to 5 carbon atoms, a fluorine-substituted acyl group having 2 to 6 carbon atoms, or a halogen atom, and * represents a bonding site, wherein at least one A is the group represented by formula (III-4), the group represented by formula (III-5), the group represented by formula (III-6), the group represented by formula (III-7) or the group represented by formula (III-8), (III-1)

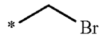

(III-2)

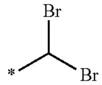

(III-3)

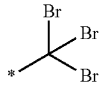

(III-4)

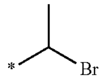

(III-5)

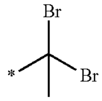

-continued (III-6)

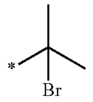

(III-7)

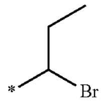

(III-8)

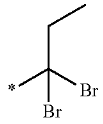

α and β in formula (II-1) are integers satisfying (a), and α1, β1, α2, and β2 in formulae (II-2) and (II-3) are integers satisfying (b), $$1 \leq \alpha \leq 4, 0 \leq \beta \leq 3, 2 \leq \alpha + \beta \leq 4 \quad (a)$$

$$1 \leq \alpha 1 + \alpha 2 \leq 8, 0 \leq 1 + \beta 2 \leq 7, 2 \leq \alpha 1 + \alpha 2 + \beta 1 + \beta 2 \leq 8 \quad (b)$$

$R^a$ and $R^b$ in formula (II-2) each represent a hydrogen atom, unsubstituted methyl, unsubstituted ethyl, unsubstituted n-propyl, unsubstituted i-propyl, or a fluorine-substituted alkyl group having 1 to 5 carbon atoms, and in formulae (III-1) to (III-8), * represents a bonding site.

* * * * *